(12) United States Patent
Kim

(10) Patent No.: US 11,294,554 B2
(45) Date of Patent: Apr. 5, 2022

(54) DISPLAY APPARATUS AND IMAGE DISPLAYING METHOD

(71) Applicant: SAMSUNG ELECTRONICS CO., LTD., Suwon-si (KR)

(72) Inventor: Myoung-Woon Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 867 days.

(21) Appl. No.: 16/078,375

(22) PCT Filed: May 26, 2016

(86) PCT No.: PCT/KR2016/005566
§ 371 (c)(1),
(2) Date: Aug. 21, 2018

(87) PCT Pub. No.: WO2017/146304
PCT Pub. Date: Aug. 31, 2017

(65) Prior Publication Data
US 2021/0271378 A1 Sep. 2, 2021

(30) Foreign Application Priority Data

Feb. 26, 2016 (KR) ........................ 10-2016-0023479

(51) Int. Cl.
*G06F 3/0484* (2013.01)
*G06F 3/04845* (2022.01)
(Continued)

(52) U.S. Cl.
CPC .......... *G06F 3/04845* (2013.01); *G01S 19/42* (2013.01); *G06F 1/3265* (2013.01);
(Continued)

(58) Field of Classification Search
CPC ............ G04G 9/007; H04M 1/725; G06F 2203/04803; G06F 3/04845; G06F 3/0482; G06F 1/3265; G01S 19/42
See application file for complete search history.

(56) References Cited

U.S. PATENT DOCUMENTS

| 5,796,401 A | 8/1998 | Winer |
| 7,456,823 B2 | 11/2008 | Poupyrev et al. |

(Continued)

FOREIGN PATENT DOCUMENTS

| JP | 2007-298878 A | 11/2007 |
| JP | WO2011/033877 A1 | 2/2013 |

(Continued)

OTHER PUBLICATIONS

Communication dated Nov. 24, 2016 issued by the Int. Searching Authority in counterpart Application No. PCT/KR2016/005566 (PCT/ISA/210).

*Primary Examiner* — Pei Yong Weng
(74) *Attorney, Agent, or Firm* — Sughrue Mion, PLLC

(57) ABSTRACT

Disclosed are a display apparatus and an image displaying method, which can increase a battery usage time. The display apparatus includes a display including a screen for displaying an image; and a controller configured to provide the display a first user interface (UI) for selecting at least one among a plurality of regions in the screen, provide the display a second UI for adjusting a displaying position of the image to be displayed on at least one region selected through the first UI, and control the display to display the image at the displaying position adjusted through the second UI, and make the other regions of the screen except the region where the image is displayed be in a power-saving mode. According to the present invention, it is possible to not only increase a battery usage time but also display information at a position desired by a user.

13 Claims, 40 Drawing Sheets

(51) Int. Cl.
    *G01S 19/42*        (2010.01)
    *G06F 1/3234*     (2019.01)
    *G06F 3/0482*     (2013.01)
    *G04G 9/00*        (2006.01)
    *H04M 1/725*     (2021.01)

(52) U.S. Cl.
    CPC .......... *G06F 3/0482* (2013.01); *G04G 9/007* (2013.01); *G06F 2203/04803* (2013.01); *H04M 1/725* (2013.01)

(56) References Cited

U.S. PATENT DOCUMENTS

| | | |
|---|---|---|
| 2004/0008191 A1 | 1/2004 | Poupyrev et al. |
| 2012/0316455 A1 | 12/2012 | Rahman et al. |
| 2013/0254705 A1 | 9/2013 | Mooring et al. |
| 2015/0348495 A1* | 12/2015 | Kim ........................ G06F 1/163 345/156 |

FOREIGN PATENT DOCUMENTS

| | | |
|---|---|---|
| JP | 2015-84093 A | 4/2015 |
| KR | 10-2012-0032888 A | 4/2012 |
| KR | 10-1237443 B1 | 2/2013 |
| KR | 10-2013-0058177 A | 6/2013 |
| KR | 10-2013-0120817 A | 11/2013 |
| KR | 10-2014-0117110 A | 10/2014 |
| KR | 10-2015-0087834 A | 7/2015 |
| KR | 10-2015-0138727 A | 12/2015 |

\* cited by examiner

DISPLAY APPARATUS AND IMAGE DISPLAYING METHOD

TECHNICAL FIELD

The present invention relates to a display apparatus and an image displaying method, in which settings are made adaptively to display an image in accordance with display types or user environments, thereby reducing power consumed in displaying the image.

BACKGROUND ART

With recent development of hardware and software technologies, an electronic apparatus has supported various user functions to be complexly implemented. Further, more and more electronic apparatuses have various displays that can be curved, split, folded, and combined.

In particular, a battery usage time is an important technological factor in a mobile or wearable apparatus. To increase the battery usage time, there has been proposed a method of increasing the capacity of a battery by hardware improvement or a displaying method of a power saving mode for reducing battery power consumed in the electronic apparatus by software improvement.

However, a conventional displaying method of the power saving mode has problems as follows.

The conventional displaying method of the power saving mode displays an image as a full screen or turns off the whole screen. That is, the conventional displaying method of the power saving mode checks information necessary for the apparatus in response to a wake-up gesture whenever it is desired in the state that the whole screen is turned off, and thus consumes battery power as the whole display is activated until returning back to the power saving mode.

The conventional displaying method is effective in saving power in a case of occasionally using the display, but ineffective in a case of messages, mails, time, real-time records and the like highly frequently displayed.

For example, it may be very dangerous when a user, who wears a wearable electronic device, raises his/her arm to check information while driving. Accordingly, a user needs to check the information without moving the wearable electronic device in front of his/her eyes while driving.

DISCLOSURE

Technical Problem

An object of the present invention is to solve conventional problems and provide a display apparatus and an image displaying method, in which a power saving effect is good even when a user highly frequently check information.

Another object of the present invention is to provide a display apparatus and an image displaying method, in which power-saving mode displaying is finely adjustable according to a user's tastes or use environments.

Still another object of the present invention is to provide a display apparatus and an image displaying method, in which a user interface is provided for making power-saving mode displaying be easily adjustable even in a small display apparatus.

Technical Solution

In accordance with an embodiment of the present invention, a display apparatus comprises a display comprising a screen for displaying an image; and a controller configured to provide the display a first user interface (UI) for selecting at least one among a plurality of regions in the screen, provide the display a second UI for adjusting a displaying position of the image to be displayed on at least one region selected through the first UI, and control the display to display the image at the displaying position adjusted through the second UI, and make the other regions of the screen except the region where the image is displayed be in a power-saving mode.

The controller may control the image to be displayed at the displaying position adjusted in response to a user's input for a power-saving display mode.

The controller may control the image to be displayed at the displaying position adjusted in response to occurrence of an event.

The event may occur from an external apparatus.

The image may comprise a plurality of objects, and the controller may provide a third UI for selecting and adjusting at least one among the plurality of objects.

The third UI may be provided in response to selection of a region through the first UI.

The second UI may be provided in response to selection of an object through the third UI.

The second UI and the third UI comprise a plurality of image adjusting menus about the display positions and a plurality of object adjusting menus, respectively.

When an input for selecting one among the plurality of image adjusting menus or one among the plurality of object adjusting menus is received, the controller may hide at least one of the other menus.

The second UI may be provided in a region adjacent to the selected region.

The first UI may be provided on the screen throughout a plurality of regions.

The display apparatus may further comprise a gyroscope configured to sense an orientation of the display, wherein the first UI is provided as at least one among the plurality of regions is activated corresponding to the orientation of the display.

The display apparatus may further comprise a global positioning system (GPS) for sensing a location of the display apparatus, wherein the controller provides the image in a power-saving display mode according to the location sensed by the GPS.

The display apparatus may further comprise a GPS for sensing a location of the display apparatus, wherein the controller provides the image in a normal display mode according to the location sensed by the GPS.

In accordance with an embodiment of the present invention, an image displaying method of a display apparatus comprises: receiving an input for setting an image in a power-saving display mode; providing a first user interface (UI) for selecting at least one among a plurality of regions in a screen of the display apparatus in response to the input received for the setting; receiving an input for selecting at least one region through the first UI; providing a second UI for adjusting a displaying position of the image to be displayed on the at least one selected region; receiving an input for adjusting the displaying position of the image through the second UI; and displaying the image at the displaying position adjusted through the second UI and making the other regions except the adjusted displaying position be displayed in a power-saving mode.

In accordance with an embodiment of the present invention, a nonvolatile recording medium stores a program for performing the foregoing image displaying method.

Advantageous Effects

As described above, the display apparatus according to the present invention has a good power saving effect of a battery when a user highly frequently check information, thereby increasing a usage time.

Further, a user can finely and easily adjust power-saving mode displaying adaptive to his/her tastes or use environment through the UI. For example, a user may adjust a position and size of an image display window, or a position and size of a test object as desired by him/her.

Further, unlike the conventional power-saving mode of turning on or off the whole screen, only a portion of displaying the information is turned on and the other portion is turned off, thereby saving battery power.

Further, an image is displayed at a specific position, in which a user conveniently and easily views the display, of the whole screen in accordance with situations, so that the user can always easily check the information.

Further, a user can make a specific application program be displayed in a power saving mode in accordance with the location or orientation of the display apparatus.

In particular, a user can easily adjust the power-saving mode displaying even in an electronic apparatus using a small display.

BEST MODE

Figure 1A:
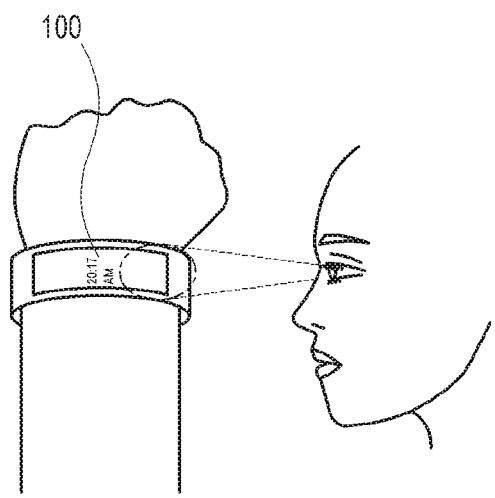
FIGS. 1A and 1B illustrate an example of changing a display position of an image according to an embodiment of the present invention.

Below, embodiments of the present invention will be described in detail with reference to the accompanying drawings so as to be easily materialized by a person having an ordinary skill in the art to which the present invention pertains. The present invention may be embodied in various forms, but not limited to the embodiments set forth herein.

The following embodiments are not restricted to specific embodiments, and it should be construed that all allowable modification, equivalents and/or alternatives fall within the scope of the invention. Throughout the accompanying drawings, like numerals refer to like elements.

In this specification, "have," "may have," "include," "may include" or the like expression refers to presence of the corresponding features (e.g.: numerical values, functions, operations, or elements of parts, and does not exclude additional features.

In this specification, "A or B," "at least one of A or/and B," "one or more of A or/and B" or the like expression may involve any possible combination of listed elements. For example, "A or B," "at least one of A and B," or "at least one A or B" may refer all of (1) at least one A, (2) at least one B, or (3) both at least one A and at least one B.

In this specification, "a first," "a second," "the first," "the second" or the like expression may modify various elements regardless of order and/or importance, and does not limit the elements. These expressions may be used to distinguish one element from another element. For example, a first user device and a second user device are irrelevant to order or importance, and may be used to express different user devices. For example, a first element may be named a second element and vice versa without departing from the scope of the invention.

When a certain element (e.g. first element) is "operatively or communicatively coupled with/to" or "connected to" a different element (e.g. second element), it will be understood that the certain element is directly coupled to the different element or coupled to the different element via another element (e.g. third element). On the other hand, when a certain element (e.g. first element) is "directly coupled to" or "directly connected to" the different element (e.g. second element), it will be understood that another element (e.g. third element) is not interposed between the certain element and the different element.

In this specification, the expression of "configured to" may be for example replaced by "suitable for," "having the capacity to," "designed to," "adapted to," "made to," or "capable of" in accordance with circumstances. The expression of "configured to" may not necessarily refer to only "specifically designed to" in terms of hardware. Instead, the "device configured to" may refer to "capable of" together with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

In this specification, terms may be used just for explaining a certain embodiment and not intended to limit the scope of other embodiments. A singular expression may involve a plural expression as long as it does not clearly give different meaning contextually. All the terms set forth herein, including technical or scientific terms, have the same meanings as those generally understood by a person having an ordinary skill in the art. Terms defined in a general-purpose dictionary may be construed to have the same or similar meanings as the contextual meanings of the related art, and should not be interpreted as ideally or excessively formal meanings. As necessary, even the terms defined in this specification may be not construed to exclude the embodiments of the present invention.

Figure 1B:
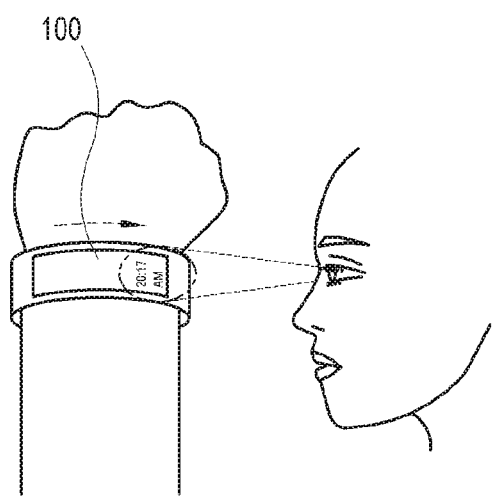

FIGS. 1A and 1B illustrate a use state of a display apparatus 100 according to an embodiment of the present invention. The display apparatus 100 is materialized by a wearable electronic device such as a smart watch with a display for visually displaying information. As the wearable electronic device, the smart watch may include the display curved to surround a wrist. As shown in FIG. 2, the display apparatus 100 with the curved display includes an easy-sight portion and a blind portion in accordance with a view angle of a user. FIG. 1A shows that information is displayed at a general center region, and FIG. 1B shows that information is displayed at a right region. In a case where a user wears the smart watch on his/her left wrist while driving a car or a bicycle, the information is seen well when it is displayed on a right side of a display. On the other hand, in a case of wearing the smart watch on a right wrist, the information is seen well when it is displayed on a left side of the display.

Figure 2A:
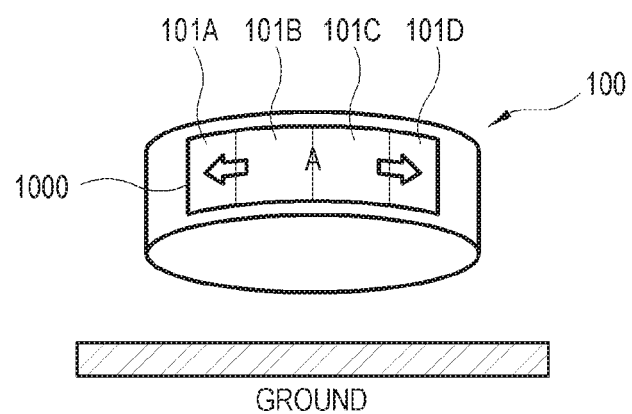
FIGS. 2A and 2B illustrate a display area split according to changes in an orientation of a display apparatus.
Figure 2B:
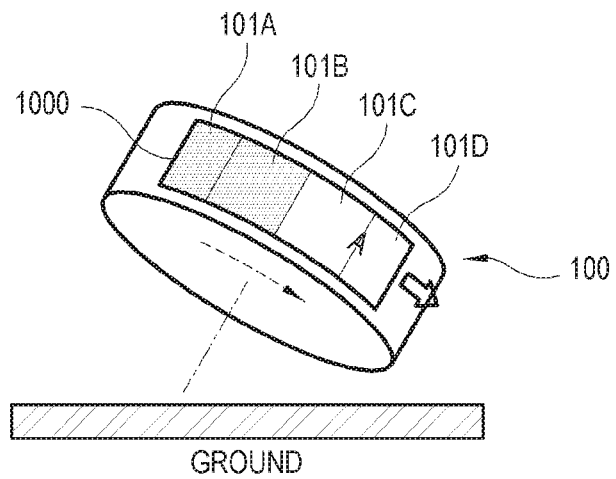
Figure 3:
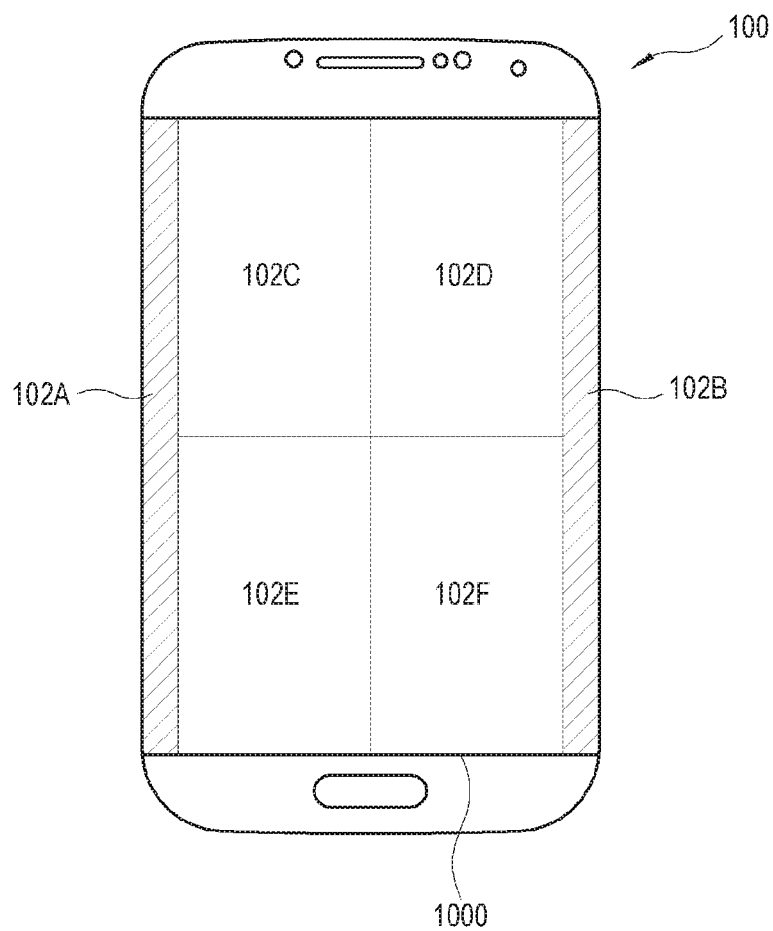
FIG. 3 illustrates a plurality of sub screens split in a smart phone.

FIGS. 2A and 2B illustrate an example of changing a display region of an image according to an orientation of a display apparatus 1000. As shown in FIG. 2A, information "A" is displayed at the center in a normal display mode. That is, the information "A" is displayed at the center of the whole regions, i.e. among four sub screens 101A, 101B, 101C, and 101D of a screen 1000. When the display apparatus 100 is used being tilted rightward with respect to the ground, the information "A" is displayed on two right sub screens 101C and 101D of the screen 1000 and two left sub screens 101A and 101B are turned off. In this embodiment, the screen 1000 is split into four sub screens 101A, 101B, 101C, and 101D by way of example. Alternatively, the screen 1000 may be split differently according to the shape of the display. The plurality of sub screens may be achieved by splitting one screen of a single body, or may be previously separated. According to the present invention, an image displaying position can be primarily set according to the shape of the display and secondarily adjusted finely according to a user. Thus, it is not indispensable to minutely split the screen 1000 into a plurality of screens FIG. 3 illustrates that the screen 1000 of the smart phone is split into six sub screens 102A~102F. A program-related image may be fully displayed on a main screen 102C~F in a normal display mode, and partially displayed on some of six sub screens 102A~102F in a power-saving display mode while turning off the other sub screens of displaying no images, thereby saving battery power.

Figure 4:
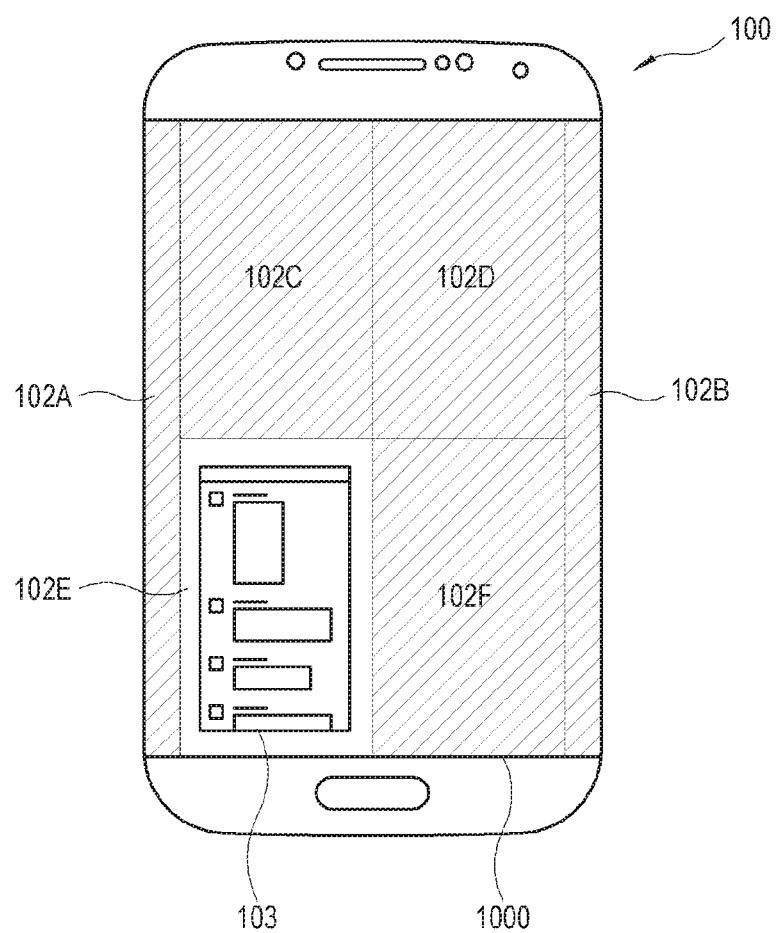
FIG. 4 illustrates an example of displaying a program-related image on one among the plurality of sub screens in FIG. 6.

FIG. 4 illustrates that a program-related image is displayed on the sub screen 102E of the main screen among six sub screens 102A~102F of FIG. 3. In this case, the other sub screens 102A~102D, and 102F, on which the program-related image is not displayed, are turned off.

The display apparatus 100 is described as the smart watch or the smart phone by way of example, but is not limited thereto. The display apparatus 100 may be materialized by not only a foldable display or a curved display but also an electronic apparatus with a flat display, for example, various apparatuses such as a tablet personal computer (PC), a laptop PC, a personal digital assistant (PDA), an MP3 player, an electronic frame, a TV, a PC, a kiosk, and the like.

Figure 5:
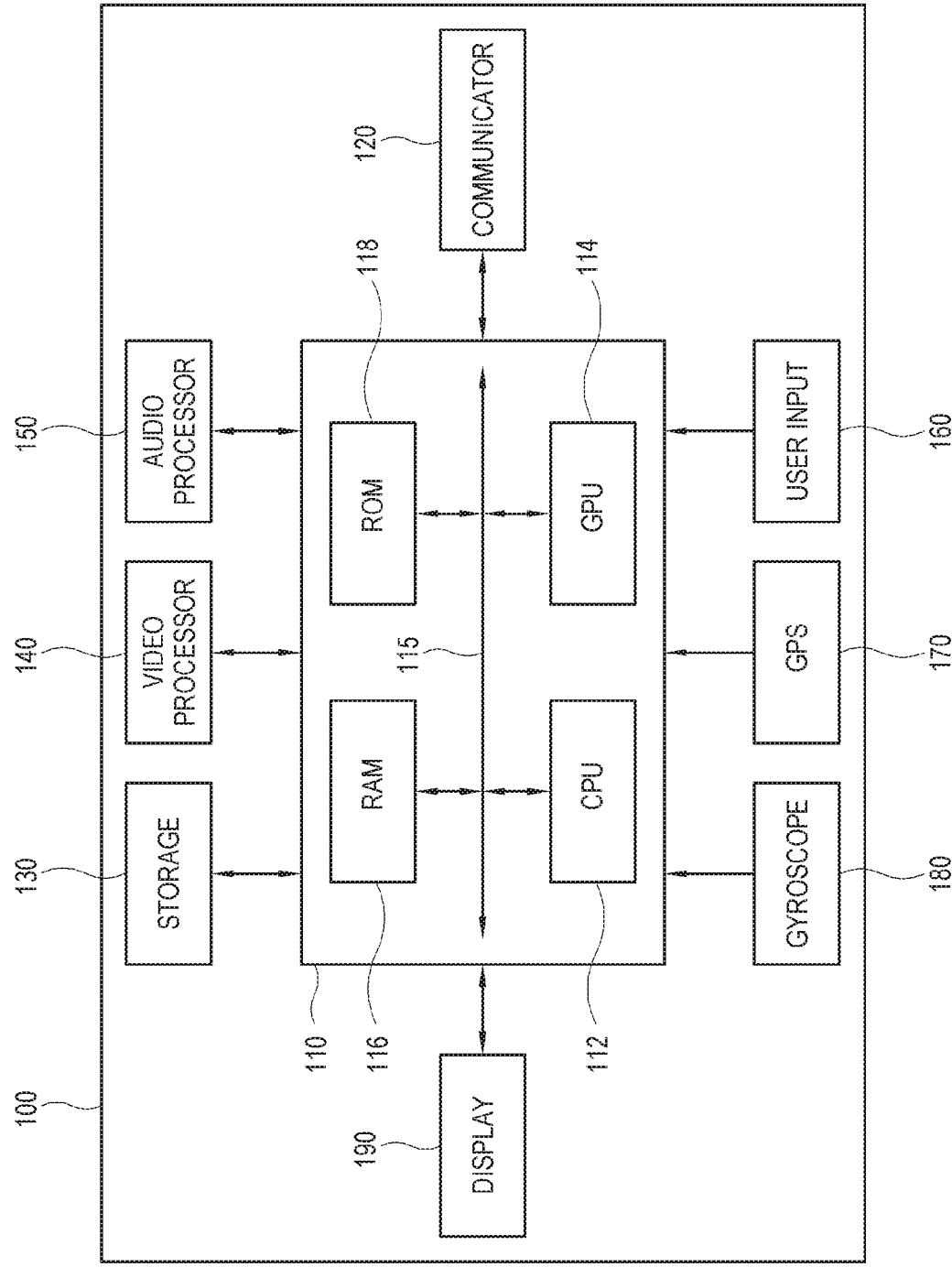
FIG. 5 is a block diagram of illustrating a display apparatus according to an embodiment of the present invention.

FIG. 5 is a block diagram of illustrating a display apparatus 100 according to an embodiment of the present invention. The display apparatus 100 includes a controller 110, a communicator 120, a storage 130, a video processor 140, an audio processor 150, a user input 160, a global positioning system (GPS) 170, a gyroscope 180, and a display 190. Of course, the display apparatus 100 may further include other elements, for example, a loudspeaker, a microphone, a motion sensor, a camera, etc. in addition to the foregoing elements.

The controller 110 includes a CPU 112, a graphic processing unit (GPU) 114, a bus 115, a random access memory (RAM) 116, and a read only memory (ROM) 118. The CPU 112, the GPU 114, the RAM 116, and the ROM 118 may be connected to one another via the bus 115.

The CPU 112 accesses the storage 130, and uses an operating system (OS) stored in the storage 130, thereby booting up a system. Further, various programs, content, data, etc. stored in the storage 130 are used to perform various operations. The ROM 118 is storing an instruction set or the like to boot up the system. When a turn-on command is input and power is supplied, the CPU 112 copies the OS stored in the storage 130 to the RAM 118 in response to an instruction stored in the ROM 118, and executes the OS to thereby boot up the system. When the system is completely booted up, the CPU 112 copies various programs stored in the storage 130 to the RAM 116, and executes the program copied to the RAM 116, thereby performing various operations.

When the display apparatus 100 is completely booted up, the GPU 114 displays a screen of a user interface (UI) in an activated region among a main region and sub regions. Specifically, the GPU 114 may use an operator (not shown) and a renderer (not shown) to generate a screen including various objects such as an icon, an image, a text, etc. related to an application program or a widget. The operator operates coordinates shapes, sizes, colors, and the like attribute values for displaying the objects in accordance with a layout of the screen. The renderer generates the screen of various layouts including the object based on the attribute value operated by the operator. The screen generated by the renderer is displayed on the display 190.

The controller 110 generally controls the elements of the display apparatus 100, for example, the communicator 120, the storage 130, the video processor 140, the audio processor 150, the user input 160, the GPS 170, the gyroscope 180, the display 190, etc., and processes, executes and controls an application program or widget in response to the input or sensed data or signal from the user input 160, the GPS 170, and the gyroscope 180. The controller 110 receives various input or sensed signals or data from an external apparatus connected to a network or the Internet of things (IoT), for example, from a server or things through the communicator 120, and processes the application program or widget by software or hardware. The controller 110 may for example include Google Android 5.0 (Lollipop), 6.0 (Marshmallow), or the like OS. The controller 110 may control the display 190 to display a UI framework stored in the storage 130 in response to a user's input signal. The controller 110 controls the storage 130 to store the application program or widget set in the power-saving display mode, and displays an image related to the application program or widget in the power-saving display mode in response to a user's specific input or an even signal of a specific condition. Further, the controller 110 may control the storage 130 to store the application program or widget set in the normal display mode, and display an image related to the application program or widget in the normal display mode in response to a user's specific input or an even signal of a specific condition.

The communicator 120 performs communication with an external apparatus connected via the network or the IoT. For example, when a car is started up, an event signal is transmitted to the communicator 120 through wired/wireless communication, and the display apparatus 100 displays an image related to a preset program or widget in the power-saving display mode in response to an event signal received through the communicator 120. When there are no programs or widgets set in the power-saving display mode in response to the event signal, a UI for setting the power-saving display mode may be loaded from the storage 130 and displayed. The communicator 120 is materialized by a Wi-Fi communication module, a Bluetooth communication module, a ZigBee communication module, and a home radio frequency (RF) communication module. In addition, the communicator 120 may be materialized by a module for near field communication (NFC) such as radio frequency identification (RFID), infrared data association (IrDA), ultra-wideband (UWB), etc.

The storage 130 is configured to store data without limitations. The storage 130 is accessed by the controller 110 and allows the controller 110 to perform reading, recording, modifying, deleting, updating, etc. with regard to the data. The storage 130 is configured to store an OS, a kernel, middleware, various application programs or widgets executable on the OS, video data, audio data, text data, etc. The application program or widget includes the application program or widget set in the power-saving display mode, and the application program or widget set in the normal display mode.

The storage 130 may include at least one of storage media such as a flash memory type, a hard disk type, a multimedia card micro type, a card type (e.g. SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The video processor 140 processes video data included in content received through the communicator 120 or content stored in the storage 130. The video processor 140 may perform various video processes such as decoding, scaling, noise filtering, frame rate conversion, resolution conversion, etc. with respect to video data.

The audio processor 150 refers to an element for processing audio data included in content received though the communicator 120 or content stored in the storage 310. The audio processor 150 may perform various audio processes such as decoding, amplification, noise filtering, etc. with respect to audio data.

The user input 160 is materialized by a touch screen, a keyboard, a button, a mouse, etc. to receive a user's command.

The GPS 170 receives a GPS signal from a GPS satellite, and calculates a current location of the display apparatus 100. The controller 110 employs the GPS 170 when a navigation program is used or when a user's current location is required. When the GPS 170 senses that the display apparatus 100 or a user is present at a specific location, a specific application program or widget may be displayed in a preset power saving mode. Likewise, when the display apparatus 100 or a user gets out of the specific location, the specific application program or widget may be switched over to the normal mode.

The gyroscope 180 senses the orientation of the display apparatus 100, i.e. a tilting direction with respect to the ground. Based on the direction sensed in the gyroscope 180, a specific application program or widget may be displayed in a set power saving mode. Likewise, the specific application program or widget may be switched over to the normal mode when the display apparatus 100 returns to a horizontal direction with respect to the ground.

The display 190 displays information to be provided to a user. The display 190 may be materialized by a liquid crystal display (LCD), an active matrix organic light emitting diode (AMOLED), a flexible display, a curved display, a transparent display, a foldable display, etc. The information to be provided to a user through the display 190 includes image information, various UIs, and the like related to the application program or the widget. According to the present invention, a portion excluding a display window in the sub screens of the display 190 set in the power saving mode is made black or turned off, so that battery power can be prevented from being wastefully consumed by unnecessary screen-region displaying, thereby increasing a battery usage time.

Figure 6:
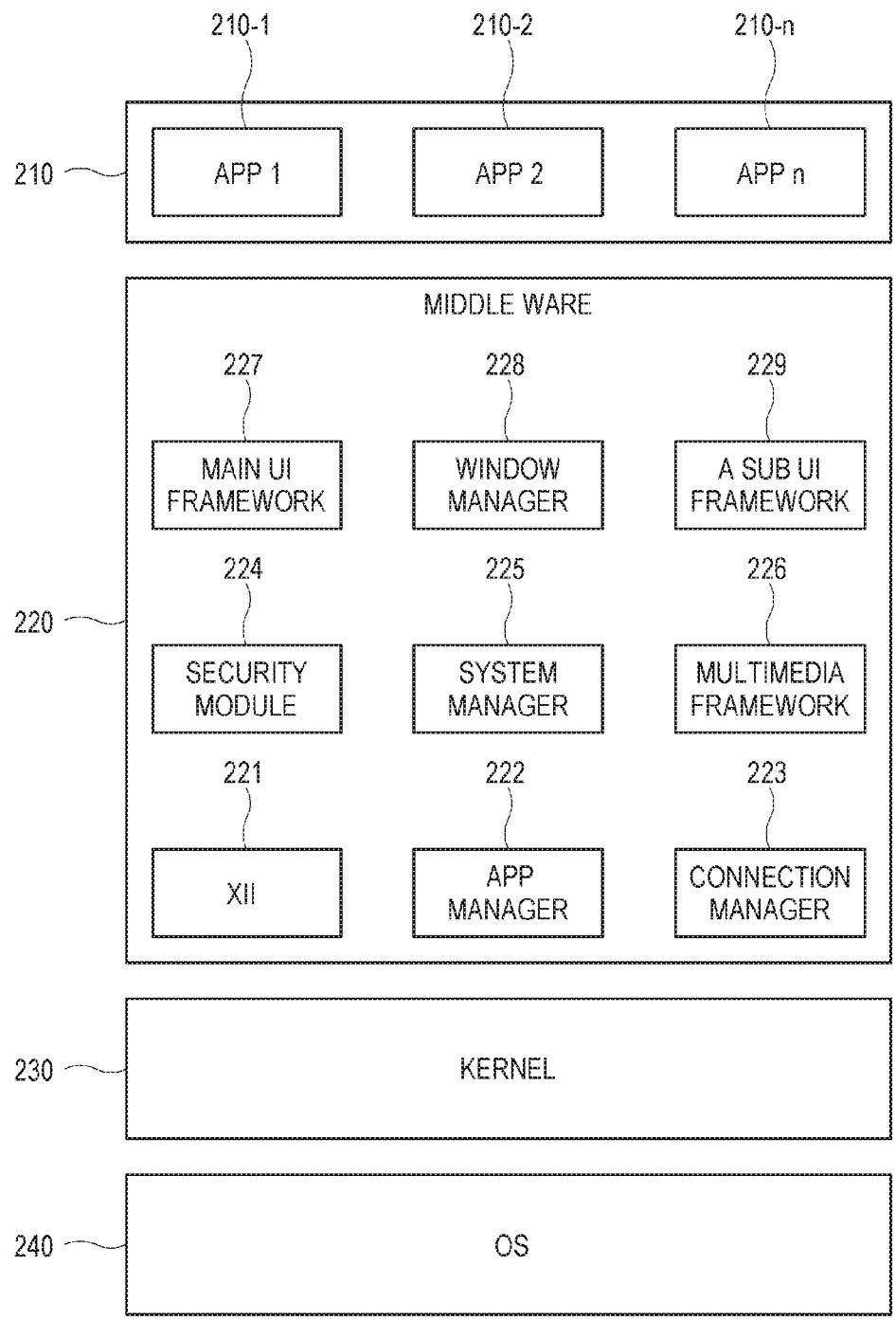
FIG. 6 is a block diagram of a software structure stored in a storage of FIG. 5.

FIG. 6 shows a software structure stored in the storage 130 of the display apparatus 100, but there are no limits to the software structure. As shown therein, the storage 130 has an application program module 210, a middleware 220, a kernel 230, and an OS 240. The storage 130 may have various programs such as a sensing module for analyzing signals sensed by various sensors; a messenger program, a short message service (SMS) & multimedia message service (MMS) program, an E-mail program, and the like messaging module; a call information aggregator module; a VoIP module; a web browser module; and the like.

The application program module 210 includes application programs 210-1~210-n for supporting various functions. For example, the application program module 210 may include programs for providing various services such as riding, a phone call, heartbeat, a navigation program, a game, an E-book, a calendar, alarm, and the like. Such application programs may be provided as default programs, or may be voluntarily installed by a user. When an object is selected, the CPU 112 may use the application program module 210 to execute an application program corresponding to the selected object.

The middle ware 220 includes various software modules for controlling the operations of the display apparatus 100. Referring to FIG. 6, the middle ware 220 includes an X11 module 221, a App manager 222, a connection manager 223, a security module 224, a system manager 225, a multimedia framework 226, a main UI frame work 227, a window manager 228, a sub UI framework 229.

The X11 module 221 refers to a module for receiving various event signals from various hardware elements provided in the display apparatus 100. Here, an event may be variously set like an event corresponding to a sensed user's gesture, an event corresponding to a system alarm, an event corresponding to execution or termination of a certain program, etc.

The App manager 222 refers to a module for managing running states of various application programs 210-1~210-n installed in the storage 130. The App manager 222 calls and executes an application program corresponding to an event when the event for executing the application program is sensed from the X11 module 221.

The connection manager 223 refers to a module for supporting wired or wireless network connection. The connection manager 223 may include various detailed modules such as a DNET module, a UPnP module, and the like.

The security module 224 refers to a module for supporting certification, request permission, secure storage, etc. with regard to the hardware.

The system manager 225 monitors the states of the elements in the display apparatus 100, and provides monitoring results to other modules. When a battery power level is low, when a user reaches a preset specific location, or when the display apparatus is tilted, the system manager 225 provides the monitoring results to the main UI framework 227 or the sub UI framework 229, thereby providing a UI of a power-saving display mode or an image in the power-saving display mode.

The multimedia framework 226 refers to a module for reproducing multimedia content stored in the display apparatus 100 or provided from an external source. The multimedia framework 226 may include a player module, a camcorder module, a sound processing module, etc.

The main UI framework 227 refers to a module for providing various UIs to be displayed on the display 190 in the normal display mode, and the sub UI framework 229 refers to a module for providing various power-saving display mode setting UIs to be displayed on the sub regions. The main UI framework 227 and the sub UI framework 229 may include an image compositor module by which various objects are composed, a coordinate compositor module for calculating coordinates at which the object will be displayed, a rendering module for rendering the composed object to the calculated coordinates, a 2D/3D UI toolkit for providing a tool to compose a 2D or 3D UI, etc.

The window manager 228 senses a touch event based on a user's body part or a pen, or other input events. The window manager 228 transmits an event signal to the main UI framework 227 or the sub UI framework 228 when such an event is sensed, so that an operation corresponding to the event can be performed.

In addition, there may be stored various program modules such as a drawing module for drawing a line along a dragging trace when a user touches or drags the screen; an angle calculation module for calculating a pitch angle, a roll angle, a yaw angle, etc. based on a sensed value; and so on.

Figure 7:
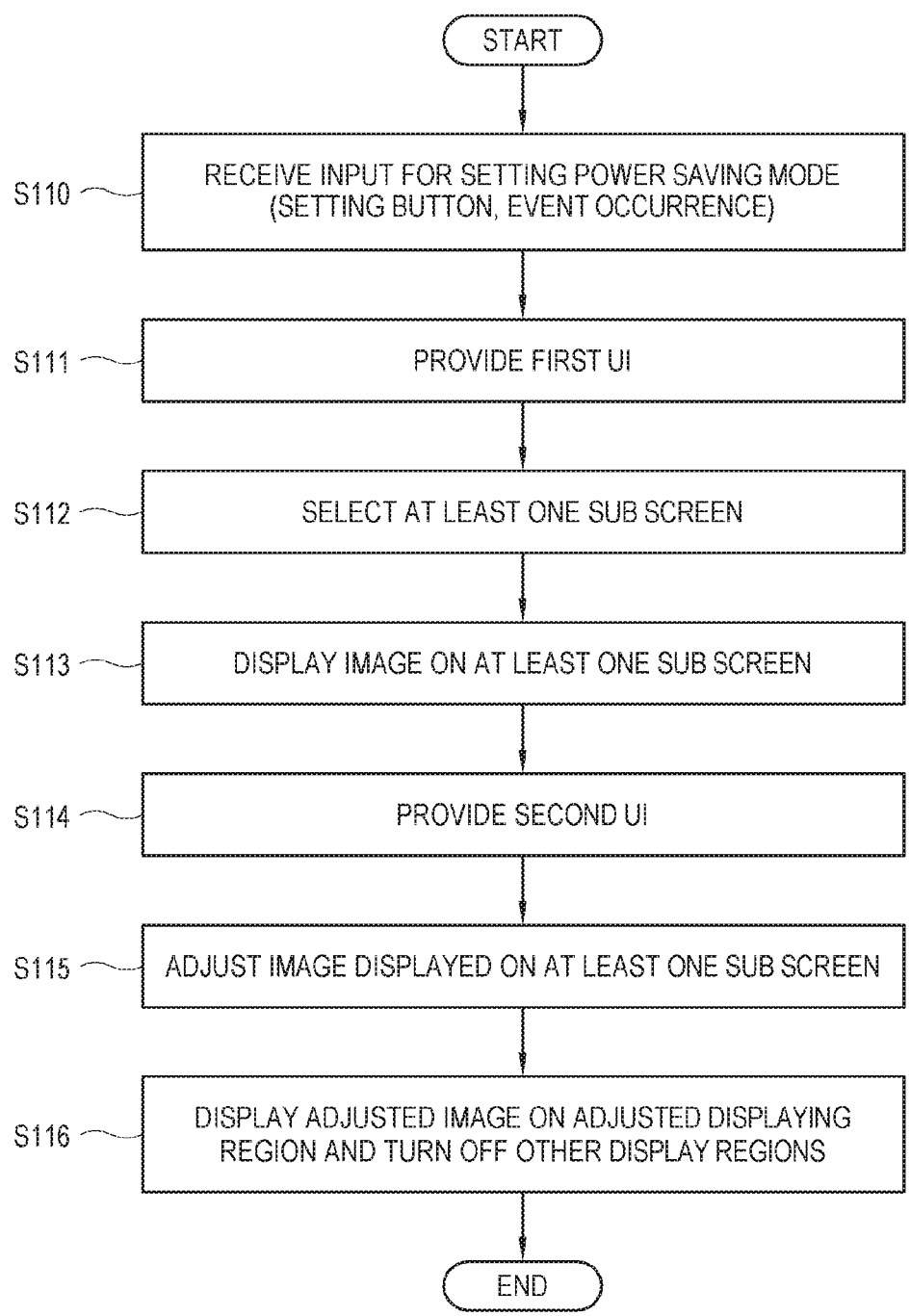
FIG. 7 is a flowchart of an image displaying method according to a first embodiment of the present invention.

FIG. 7 is a flowchart of an image displaying method according to a first embodiment of the present invention, At operation 5110, an input for setting a power saving mode with regard to a specific application program or widget is made to display an image in accordance with a user's request for increasing a battery usage time and/or a user's convenience environment. The input for setting the power saving mode is received through a power saving mode setting UI of a battery managing module, or through a power saving mode setting UI provided in response to occurrence of an event, for example, location sense of the GPS 170, orientation sense of the gyroscope 180, phone-call receipt, an alarm, message receipt, E-mail receipt, and the like occurrence of an event. An event may occur in an external apparatus, and thus an event signal may be received through the communicator 120. Further, when no events occur for a predetermined period of time, the display apparatus 100 performs displaying in a set power saving mode. When a user makes an input for setting the power-saving display mode, when no events occur for a predetermined period of time, or when a specific event occurs, it is determined whether a power saving mode of a previously set application program or widget is set. When it is determined that the power saving mode is set, the displaying is achieved in the set power saving mode. When it is determined that the power saving mode is not set, a UI for setting the power saving mode is provided. Thus, a user starts setting the power saving mode through the provided UI.

At operation 5111, a first UI for selecting a sub screen region is provided from the sub UI frame work 229 in response to the input for setting the power saving mode. In this case, the first UI is provided through a plurality of sub screen regions into which the screen is split. Thus, a user can intuitively select at least one sub screen, on which a displayed image is positioned as desired by him/her, through the first UI.

At operation 5112, at least one sub screen is selected through the first UI.

At operation 5113, an image related to the application program or widget desired to be set in the power saving mode is displayed on the sub screen selected in the operation 5112.

At operation 5114, the sub UI framework 229 provides a second UI for finely adjusting a display window of the image displayed on the selected sub screen. It is preferable that the second UI is arranged on a sub screen adjacent to the selected sub screen. The smart watch, the smart phone or the like specific display apparatus 100 may be too small to do complicated and fine adjustment when the second UI is provided on the sub screen for displaying the image. The second UI includes menus for the size adjustment, position movement, rotation, and setting confirmation of the image display window.

At operation 5115, a user adjusts the display window for the image primarily displayed on the sub screen to have a position or size as desired by him/her.

At operation 5116, the finely adjusted image is displayed to have the adjusted position and size, and the other regions except the display region are turned off. Finally, the application program or widget set in the power-saving display mode is stored in the storage 130, and provided to the region set by a user's input or the event.

Figure 8:
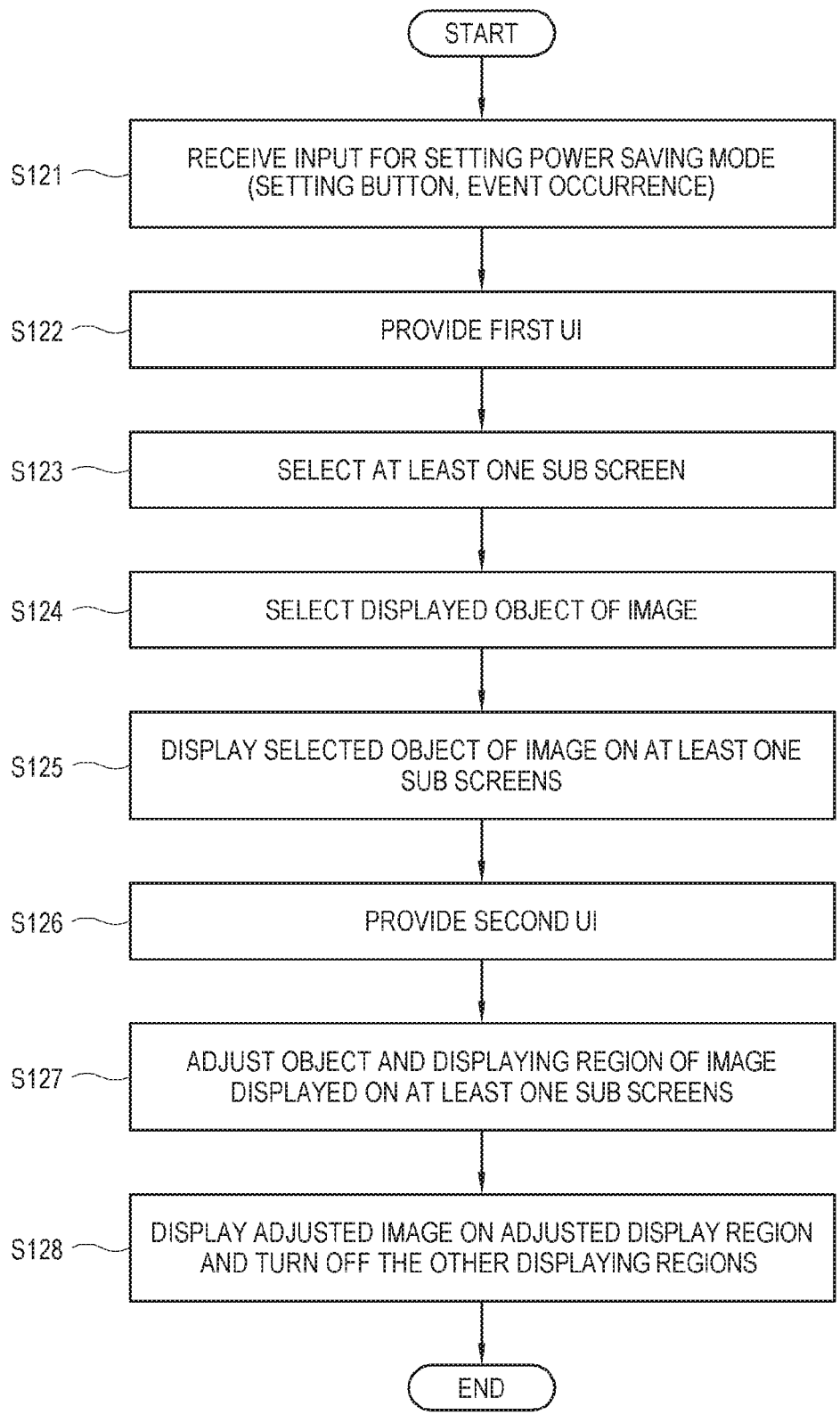
FIG. 8 is a flowchart of an image displaying method according to a second embodiment of the present invention.

FIG. 8 is a flowchart of an image displaying method according to a second embodiment of the present invention, At operation 5121, an input for setting a power saving mode with regard to a specific application program or widget is made to display an image in accordance with a user's request for increasing a battery usage time and/or a user's convenience environment. The input for setting the power saving mode is received through a power saving mode setting UI of a battery managing module, or through a power saving mode setting UI provided in response to occurrence of an event, for example, location sense of the GPS 170, orientation sense of the gyroscope 180, phone-call receipt, an alarm, message receipt, E-mail receipt, and the like occurrence of an event. An event may occur in an external apparatus, and thus an event signal may be received through the communicator 120. When a user makes an input for setting the power-saving display mode or an event occurs, it is determined whether a power saving mode of a previously set application program or widget is set. When it is determined that the power saving mode is set, the displaying is achieved in the set power saving mode. When it is determined that the power saving mode is not set, a UI for setting the power saving mode is provided. Thus, a user starts setting the power saving mode through the provided UI.

At operation 5122, a first UI for selecting a sub screen region is provided from the sub UI frame work 229 in response to the input for setting the power saving mode. In this case, the first UI is provided through a plurality of sub screen regions into which the screen is split. Thus, a user can intuitively select at least one sub screen, on which a displayed image is positioned as desired by him/her, through the first UI.

At operation 5123, at least one sub screen is selected through the first UI.

At operation 5124, an image related to the application program or widget to be displayed in the power saving mode is selected.

At operation 5125, an object selected from the image related to the application program or widget desired to be set in the power saving mode is displayed on the selected sub screen.

At operation 5126, the sub UI framework 229 provides a second UI for finely adjusting a display window and an object of the image displayed on the selected sub screen. The second UI is a UI for adjusting the display window and object of the image. It is preferable that the second UI is arranged on a sub screen adjacent to the selected sub screen. The smart watch, the smart phone or the like specific display apparatus 100 may be too small to do complicated and fine adjustment when the second UI is provided on the sub screen for displaying the image. The second UI includes menus for the size adjustment, position movement, rotation, setting confirmation of the image display window, and menus for the size adjustment, position movement, rotation, setting confirmation of the object.

At operation 5127, a user adjusts the display window and object for the image primarily displayed on the sub screen to have a position or size as desired by him/her.

At operation 5128, the finely adjusted image and object are displayed to have the adjusted position and size, and the other regions except the display region are turned off. Finally, the application program or widget set in the power-saving display mode is stored in the storage 130, and provided to the region set by a user's input or the event.

Below, a process of setting the power-saving display mode for the application program or widget will be described in detail with reference to FIGS. 9 to 38.

Figure 9:
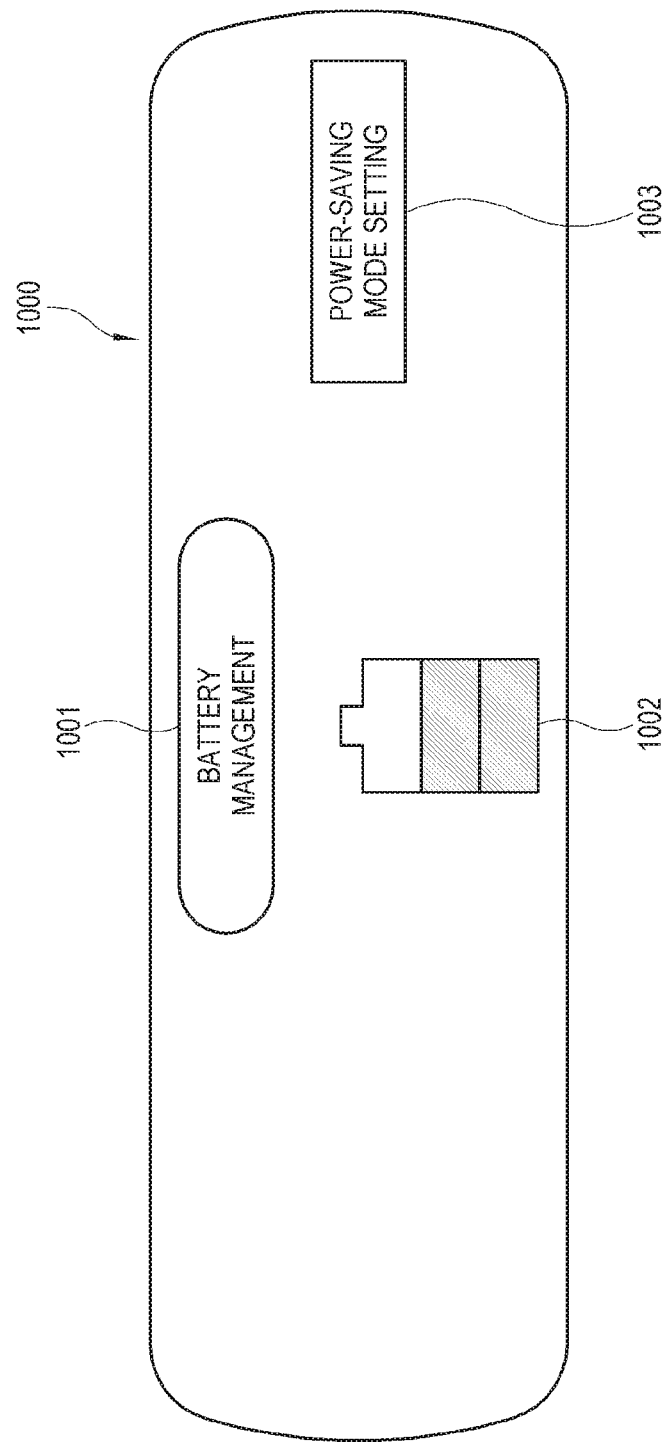
FIG. 9 illustrates a screen for setting a power saving mode.

FIG. 9 illustrates a screen 1000 displayed when the battery managing module is selected in the smart watch 100 worn on a user's wrist. As shown therein, a battery power level object 1002 is intuitively displayed, and a power-saving mode setting button 1003 is displayed. When a user selects the power-saving mode setting button 1003, an application program list 1100 to be set is displayed as shown in FIG. 10.

Figure 10:
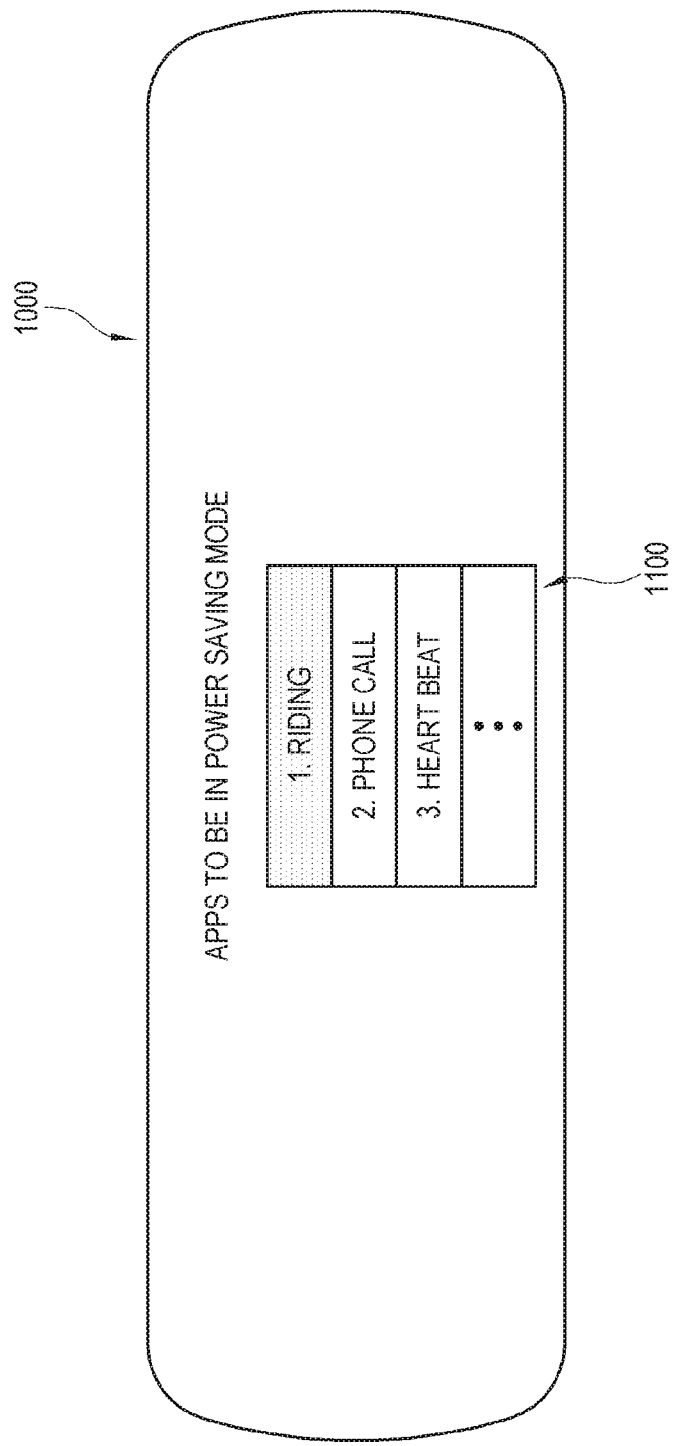
FIG. 10 illustrates a screen of an application program list for setting a power saving mode.
Figure 11:
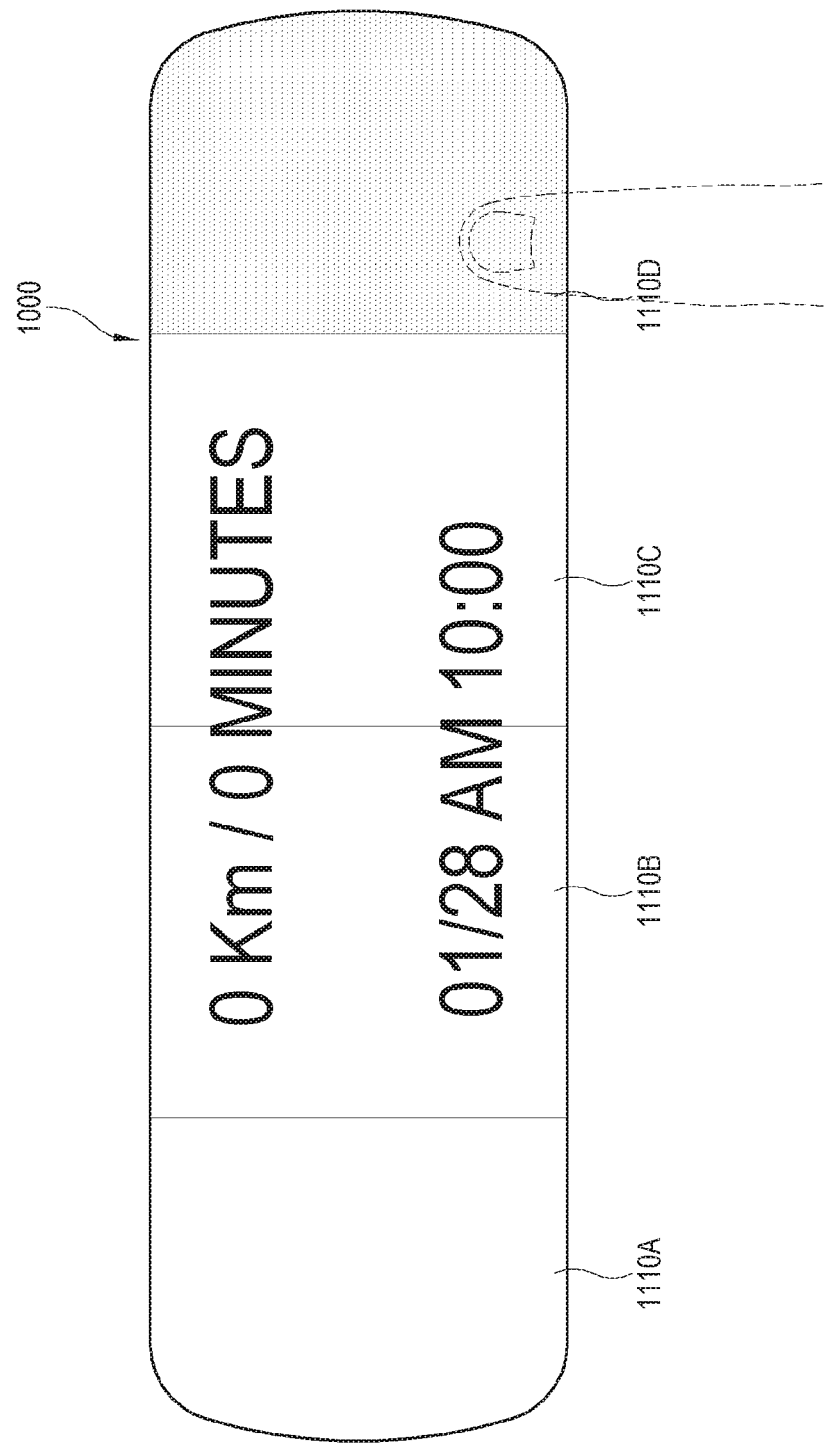
FIG. 11 illustrates a screen of a user interface (UI) for setting a display area.

FIG. 11 illustrates a screen 1000 on which a text related to "RIDING" is displayed at the center when a program of "RIDING" is selected in the list 1100 of FIG. 10. Here, the screen 1000 includes a first UI displayed as being split into regions corresponding to four sub screens 1110A-1110D. A user may directly select at least one in the first UI displayed with four split regions of the sub screens 1110A-1110D. The first UI may be previously set according to the shape of the display apparatus 100, or may be selected by a user.

Figure 12:
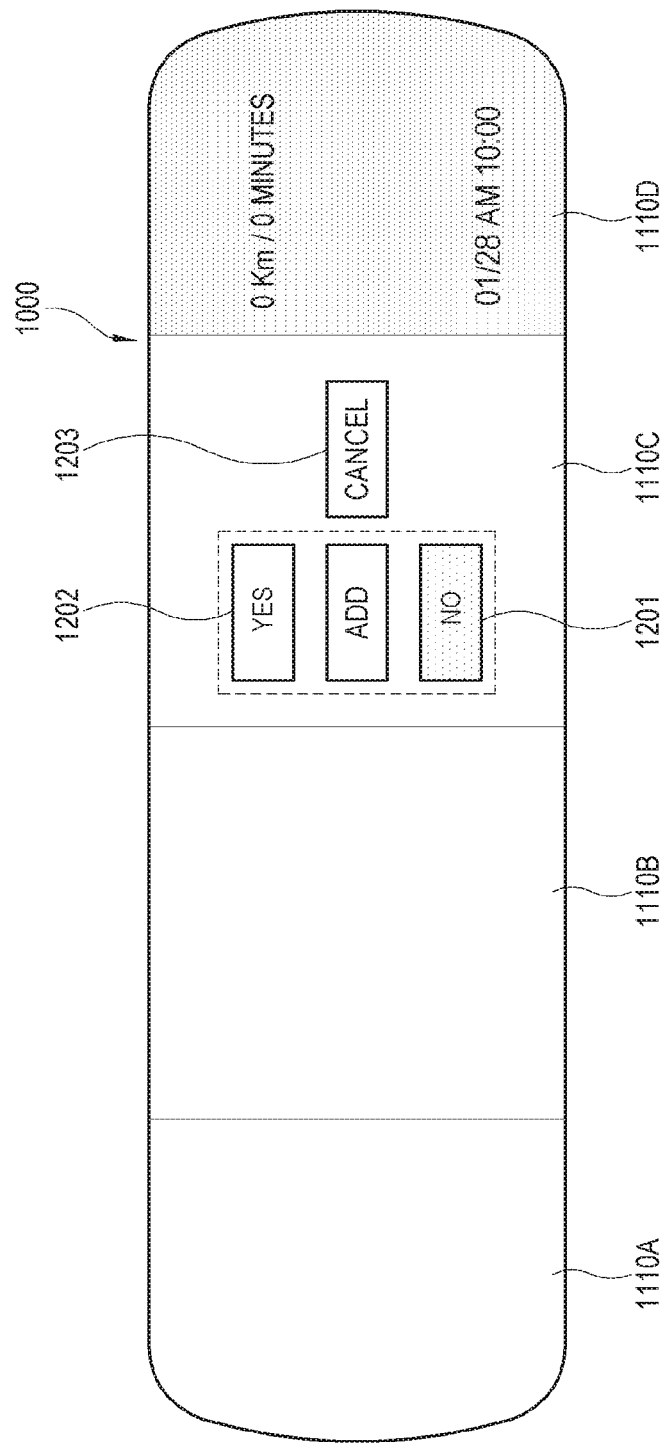
FIG. 12 illustrates a screen of a UI when one sub screen is selected in FIG. 11.

FIG. 12 illustrates a screen displayed when the rightmost sub screen 1110D is selected in FIG. 11. The screen 1000 includes blank sub screens 1110A and 1110B, a sub screen 1110C including a UI, and the sub screen 1110D displaying a riding text. The UI included in the sub screen 1110C includes a YES button 1202 for selecting an additional sub screen, a NO button 1201 for entering fine adjustment in the selected sub screen 1110D, and a sub-screen selecting/canceling button 1203.

Figure 13:
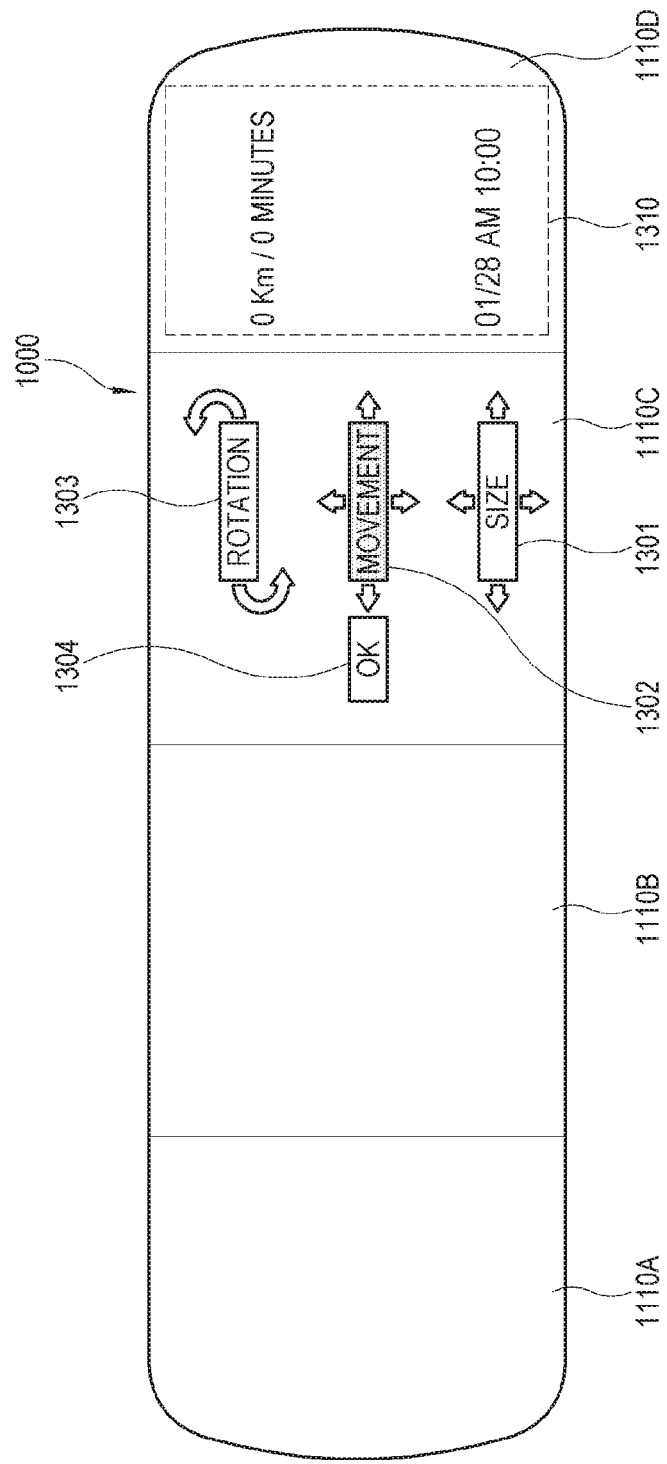
FIG. 13 illustrates a screen of a UI for adjusting a display window of an image.

FIG. 13 illustrates a screen of when the No button 1201 is selected in FIG. 12. As shown therein, the screen 1000 includes blank sub screens 1110A and 1110B, a sub screen 1110C including a second UI, and the sub screen 1110D displaying a riding text within a display window 1310. The second UI included in the sub screen 1110C includes a size adjustment button 1301 for the display window 1310 displayed within the sub screen 1110D, a movement control button 1302, a rotation control button 1303, and a setting confirmation button 1304. The second UI is set to be displayed on the sub screen 1110C adjacent to the selected sub screen 1110D. When there is a plurality of adjacent sub screens, the second UI may be displayed in all or one of them.

Figure 14:
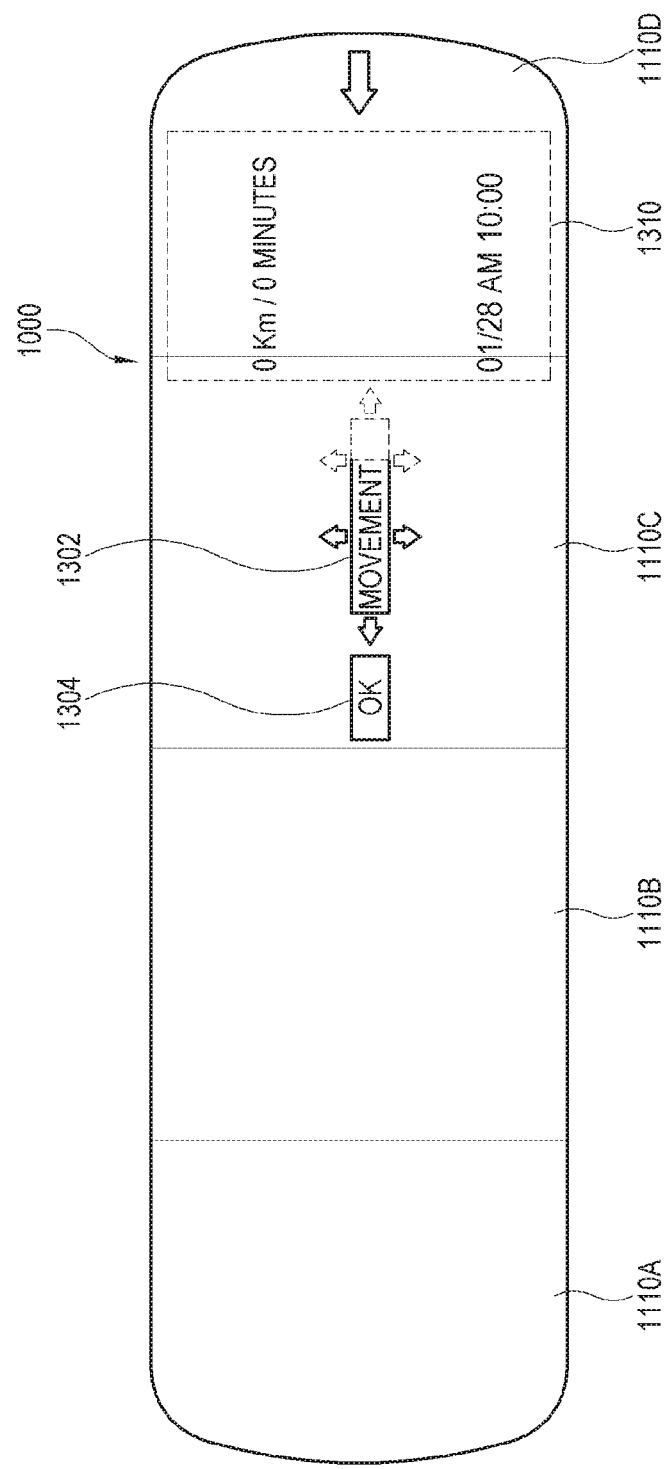
FIG. 14 illustrates a screen for moving the position of the display window in FIG. 13.

FIG. 14 illustrates a screen for moving the display window 1310, displayed on the selected sub screen 1110D, leftward by selecting the movement control button 1302 in FIG. 13. As shown therein, when the movement button 1302 is touched and then dragged in a direction desired for movement, the display window 1310 displayed on the sub screen 1110D is moved along with the moment of the movement control button 1302. When a user selects the movement button 1302 in FIG. 13, the other buttons 1301 and 1303 except the confirmation button 1304 are hidden. Therefore, when a user touches and drags a button in a display apparatus having a small screen, it is possible to prevent adjacent buttons from being touched. In this case, when the movement button 1302 is released from the touch, the movement button 1302 and the display window 1310 are positioned as moved. In this state, when the confirmation button 1304 is selected, the display window 1310 is set as moved, and the second UI for additional adjustment is displayed on the sub screen 1110C.

Figure 15:
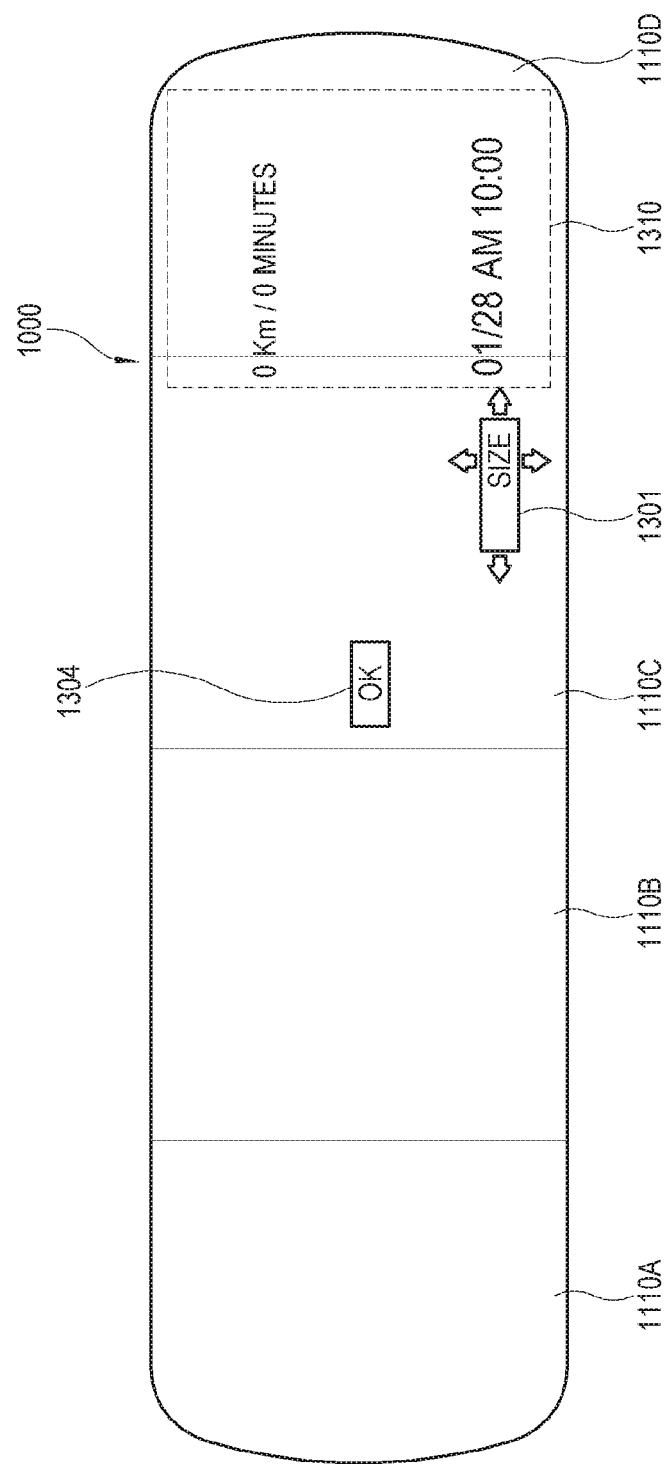
FIG. 15 illustrates a screen for enlarging the size of the display window in FIG. 13.

FIG. 15 illustrates a screen for enlarging the size of the display window 1310, displayed on the selected sub screen 1110D, leftward by selecting the size button 1301 in FIG. 13. As shown therein, when the size button 1301 is touched and then dragged in a direction desired for enlargement, the left side of the display window 1310 displayed on the sub screen 1110D is enlarged along with the leftward enlargement of the size button 1301. In this case, when the size button 1301 is released from the touch, the size button 1301 and the display window 1310 are positioned as enlarged. In this state, when the confirmation button 1304 is selected, the display window 1310 is set as enlarged, and the second UI for additional adjustment is displayed on the sub screen 1110C. On the contrary, when the size of the display window 1310 is reduced, the arrow of the size button 1301 is touched and then dragged in a direction opposite to the direction for enlargement, thereby reducing both sizes of the size button 1301 and the display window 1310.

Figure 16:
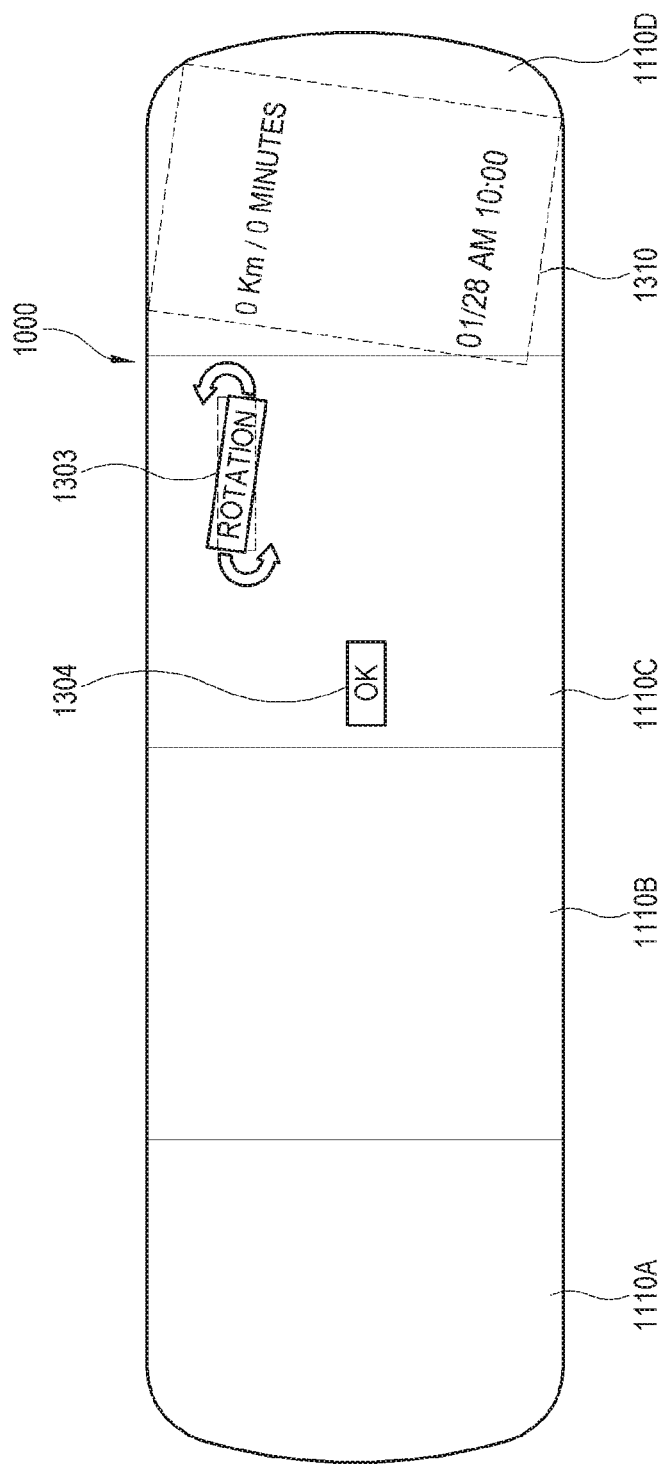
FIG. 16 illustrates a screen for rotating the display window in FIG. 13.

FIG. 16 illustrates a screen for rotating the display window 1310, displayed on the selected sub screen 1110D, clockwise by selecting the rotation button 1303 in FIG. 13. As shown therein, when the rotation button 1303 is touched and then dragged in a direction desired for rotation, the display window 1310 displayed on the sub screen 1110D is rotated along with the clockwise rotation of the rotation button 1303. In this case, when the rotation button 1303 is released from the touch, the rotation button 1303 and the display window 1310 are positioned as rotated. In this state, when the confirmation button 1304 is selected, the display window 1310 is set as rotated, and the second UI for additional adjustment is displayed on the sub screen 1110C.

Figure 17:
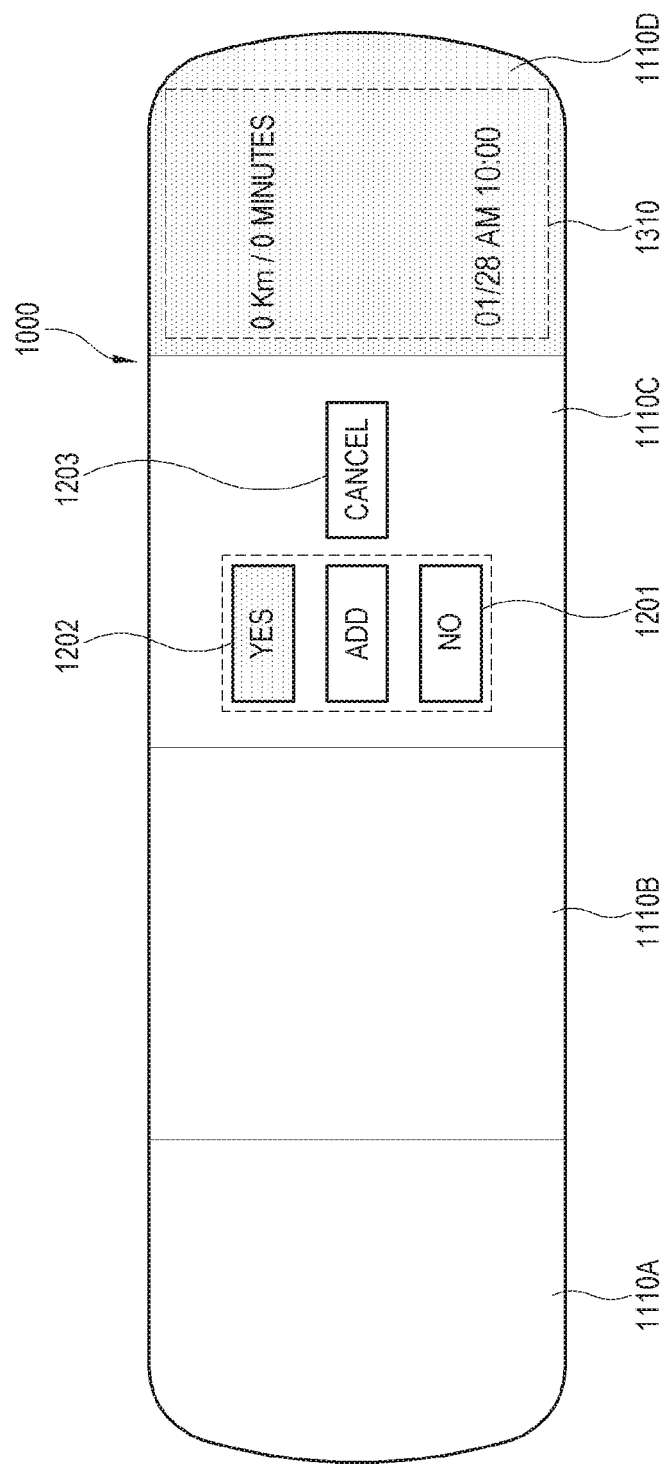
FIG. 17 illustrates a screen of another UI when one sub screen is selected in FIG. 11.

FIG. 17 illustrates a screen in which a YES button 1402 for adding the sub screen is selected in FIG. 12. When the addition of the sub screen is selected, the screen of displaying the first UI shown in FIG. 11 may be displayed.

Figure 18:
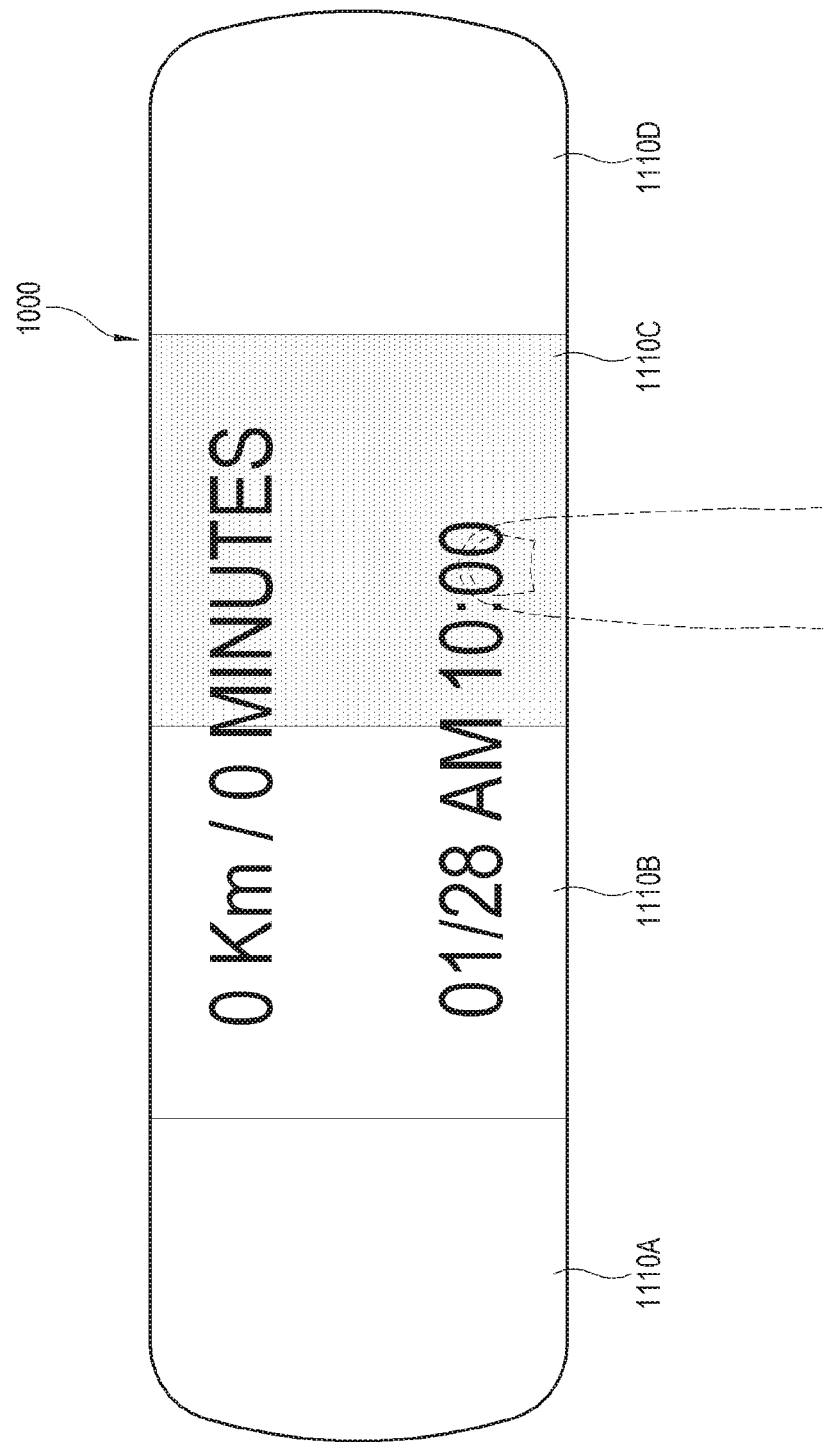
FIG. 18 illustrates a screen for selecting an additional sub screen.

FIG. 18 illustrates a screen in which a user selects the additional sub screen 1110C.

As an alternative to the embodiment of selecting the additional sub screen through the UI shown on the screen in FIGS. 12 and 17, a plurality of additional sub screens may be selected. When another sub screen 1110C is selected within a short period of time after selecting the sub screen 1110D in FIG. 12, two sub screens may be all selected. Here, the short period of time refers to a previously set period of time, for example, 2~3 seconds. When a predetermined period of time elapses after selecting one sub screen 1110D, a screen may be displayed as shown in FIG. 19 (to be described later).

Figure 19:
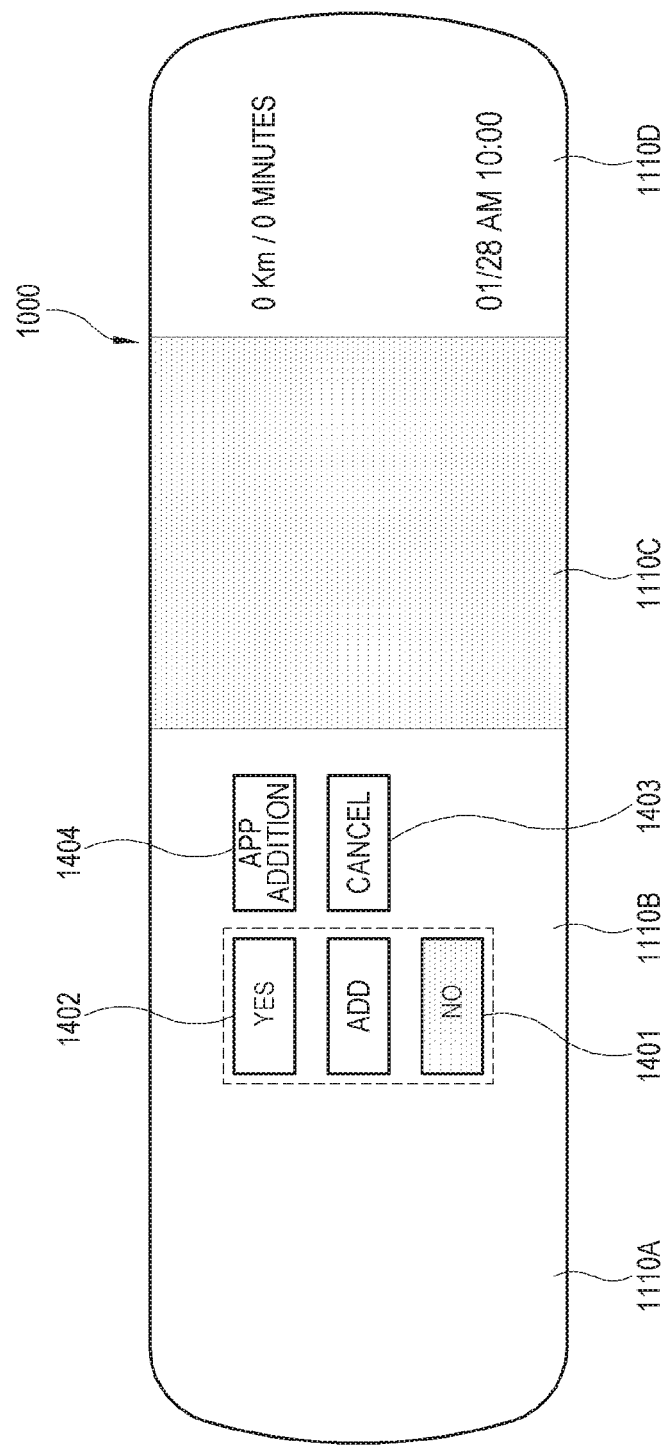
FIG. 19 illustrates a screen of a UI when the additional sub screen is selected in FIG. 18.

FIG. 19 illustrates a screen of when the second sub screen 1110C is selected in FIG. 18. As shown therein, the screen 1000 includes a blank sub screen 1110A, a sub screen 1110B including a UI, a selected blank sub screen 1110C, and the sub screen 1110D displaying a riding text. The UI included in the sub screen 1110B includes a YES button 1402 for selecting an additional sub screen, a NO button 1401 for entering fine adjustment of the display window 1310, a sub-screen selecting/canceling button 1403, and an App addition button 1404 to be displayed on the additionally selected sub screen 1110c.

Figure 20:
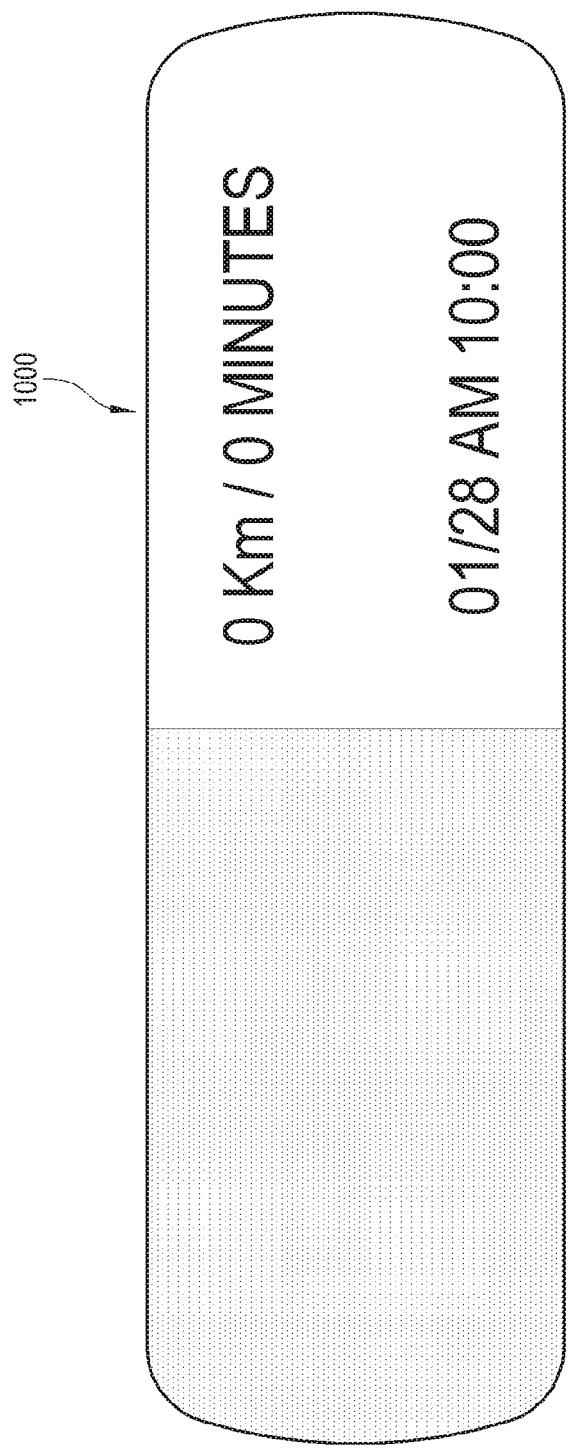
FIG. 20 illustrates a screen in which a UI is hidden after displaying an image on two sub screens.

FIG. 20 illustrates a screen of when the fine adjustment described with reference to FIGS. 13 to 16 is completed after selecting the NO button 1401 for entering the fine adjustment of the display window 1310 in FIG. 19. The riding text is displayed throughout the sub screens 1110C and 1110D, and the sub screens 1110A and 1110B are turned off.

Figure 21:
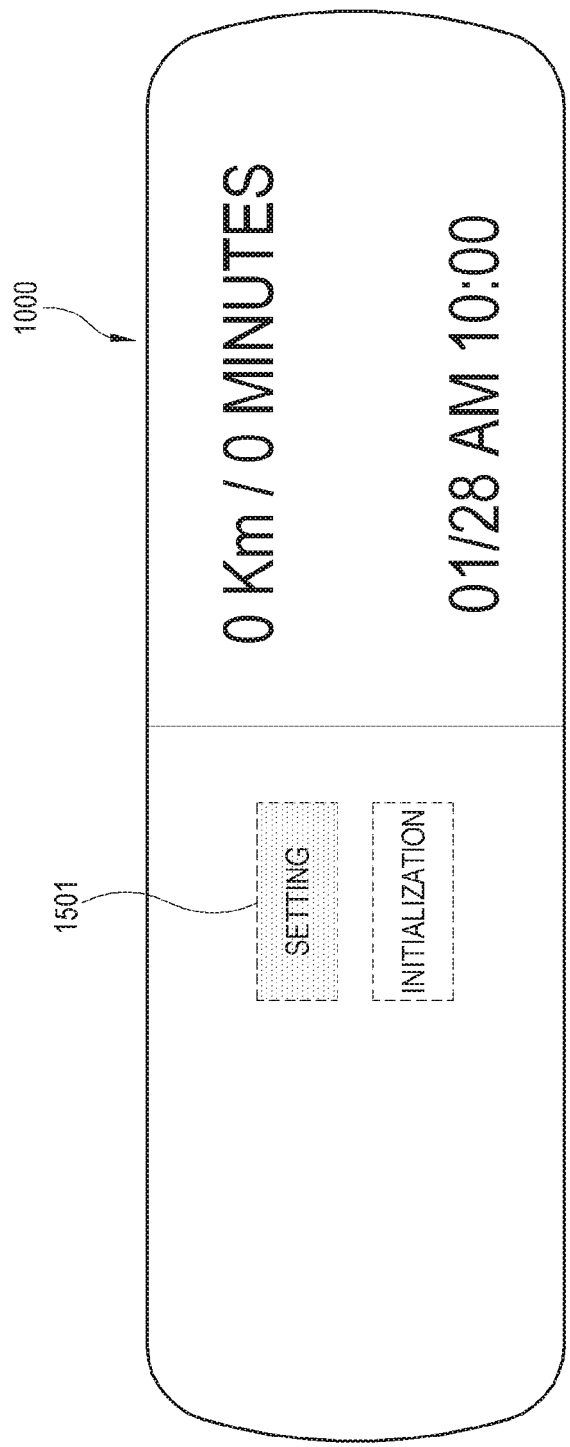
FIG. 21 illustrates a screen of a UI after displaying an image on two sub screens.

FIG. 21 illustrates a screen for additionally adjusting the image displayed on FIG. 20 or switching over to the normal display mode. When the turned-off sub screen 1110B of FIG. 20 is touched for a predetermined period of time, a setting button 1501 and an initialization button 1502 may be displayed on the sub screen 1110B as shown in FIG. 21.

Figure 22:
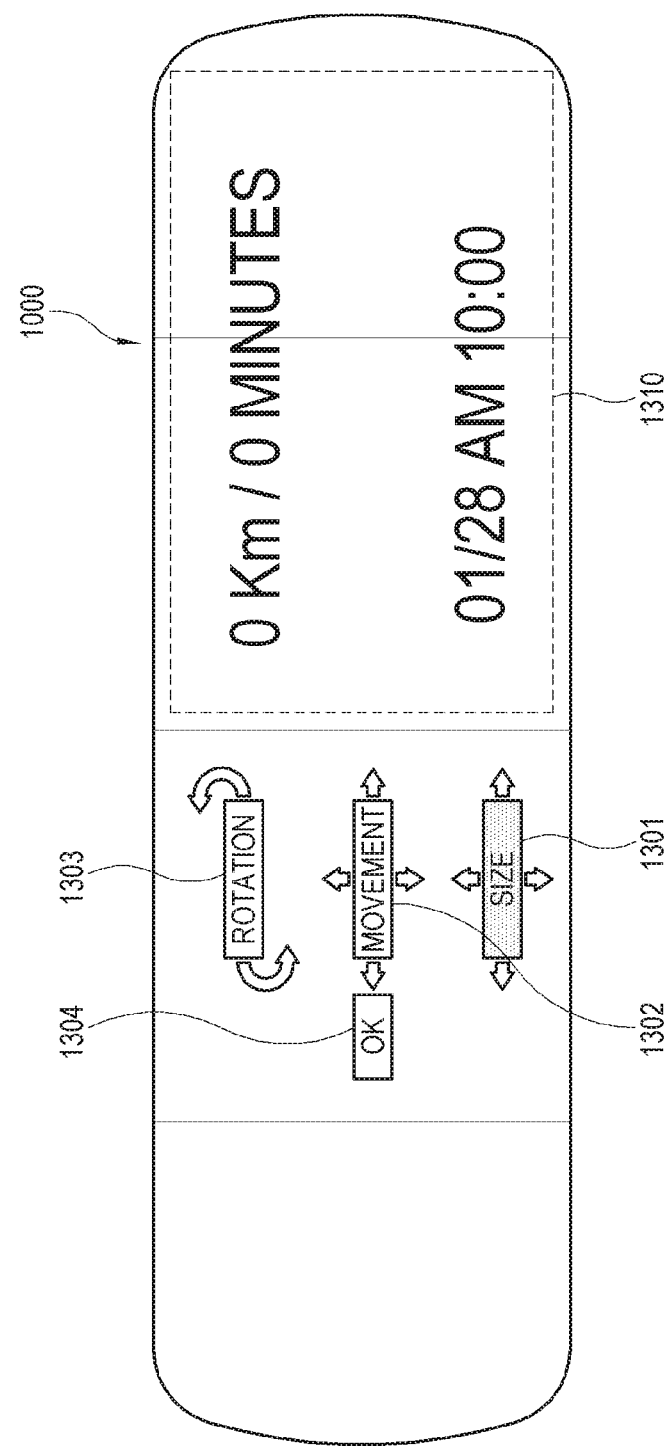
FIG. 22 illustrates a screen of a UI for adjusting an image displayed on the sub screens in FIG. 21.

FIG. 22 illustrates a screen of when the setting button 1501 is selected in FIG. 21. As shown therein, the screen 1000 includes a blank sub screen 1110A, a sub screen 1110B including the second UI, and two sub screens 1110C and 1110D displaying a riding text within the display window 1310. The second UI included in the sub screen 1110B includes the size adjustment button 1301 for the display window 1310 displayed within the two sub screens 1110C and 1110D, the movement control button 1302, the rotation control button 1303, and the setting confirmation button 1304. The second UI is set to be displayed on the sub screen 1110B adjacent to the selected sub screen 1110C.

Figure 23:
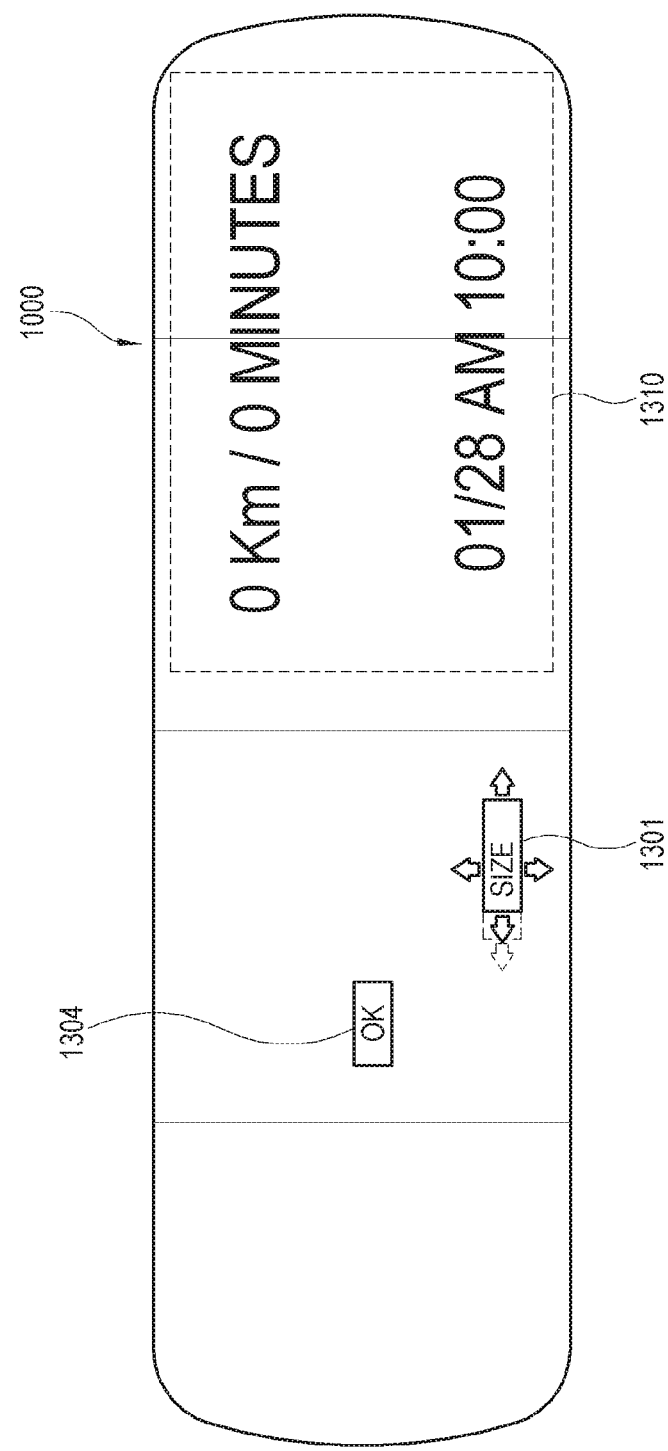
FIG. 23 illustrates a screen of a UI for reducing the size of the image displayed on the sub screen in FIG. 22.

FIG. 23 illustrates a screen for reduction by selecting the size adjustment button 1301 on the screen of FIG. 22. As shown therein, the size button 1301 is reduced rightward as touched and dragged in a direction desired for the reduction, and the left side of the display window 1310 displayed throughout the sub screens 1110C and 1110D is also reduced. In this case, when the size button 1301 is released from the touch, the size button 1301 and the display window 1310 are positioned as reduced. In this state, when the confirmation button 1304 is selected, the display window 1310 is set as reduced, and the second UI for additional adjustment is displayed on the sub screen 1110B.

Figure 24:
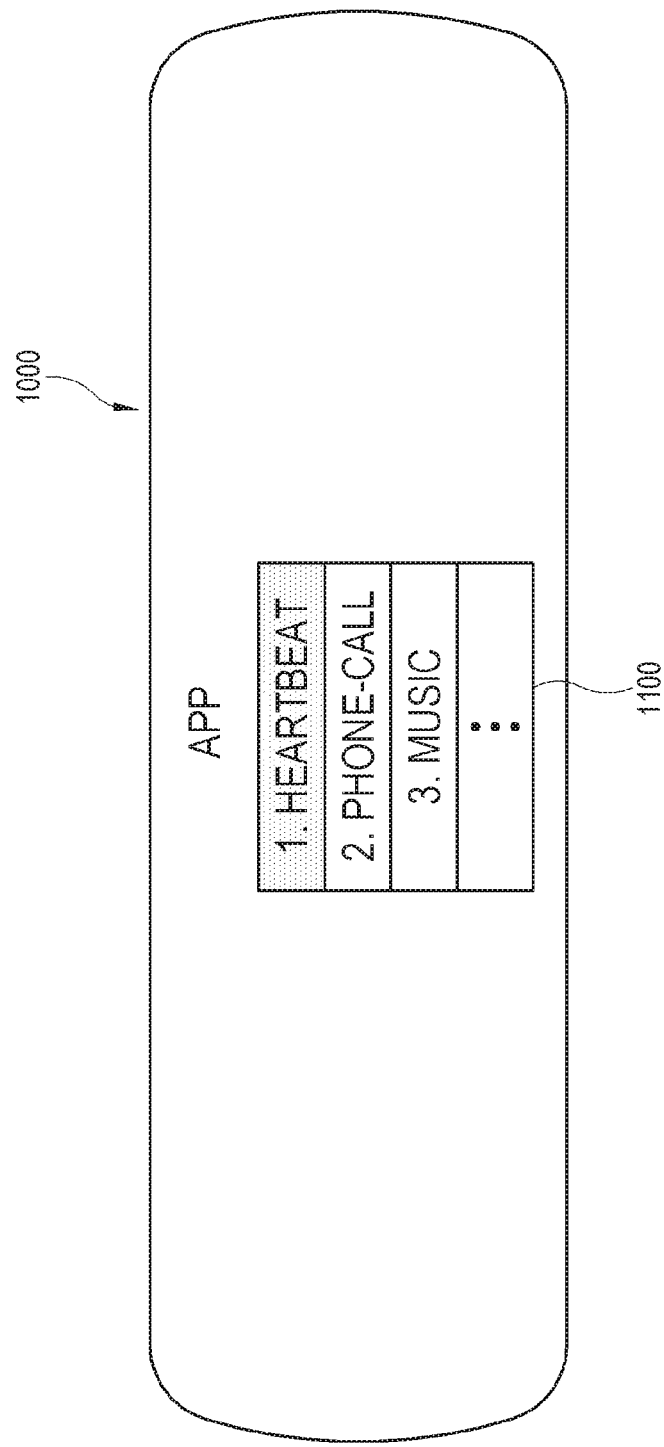
FIG. 24 illustrates a screen of an application program list when an App is additionally selected in FIG. 19.

FIG. 24 illustrates a screen of showing an application program list 1100 when an App addition button 1404 is selected in FIG. 19. In the application program list 1110, the already selected and involved "riding" program is omitted.

Figure 25:
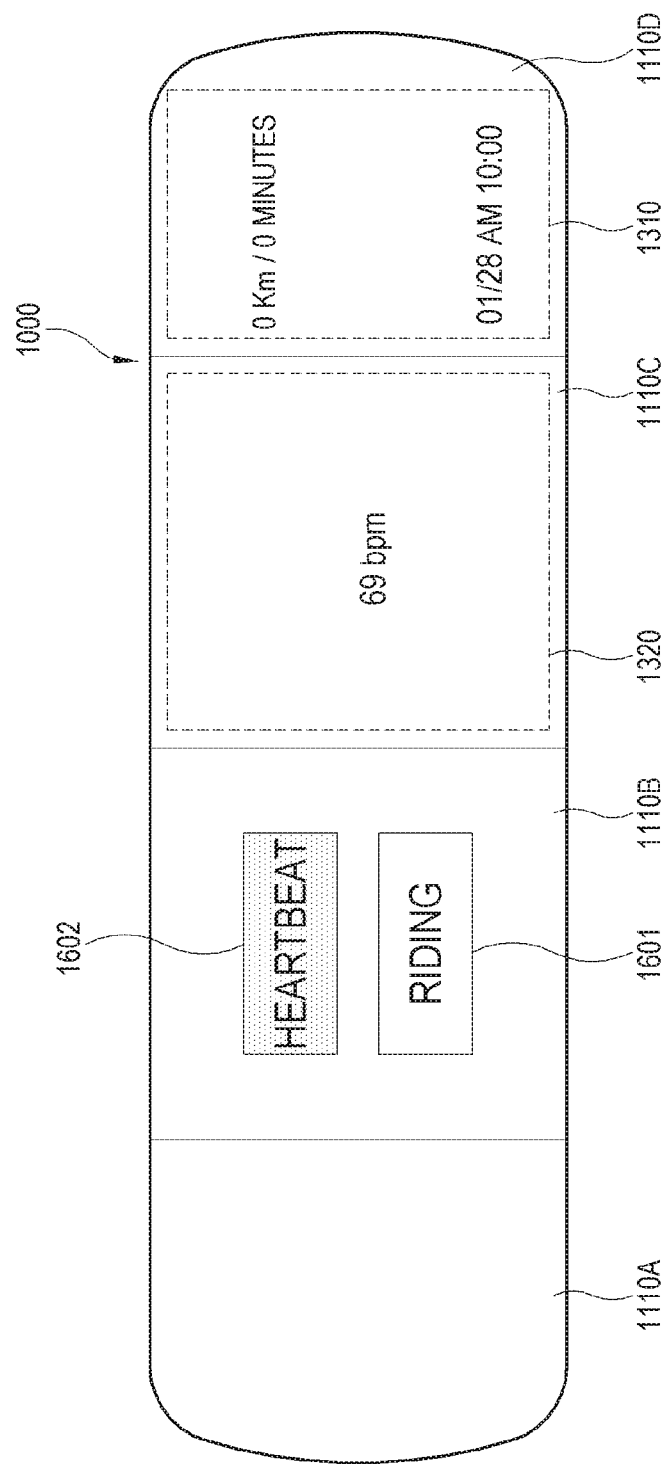
FIG. 25 illustrates a screen of a UI when a "heartbeat" App is selected in the application program list of FIG. 24.

FIG. 25 illustrates a screen of when a "heartbeat" program is selected in the application program list 1110 of FIG. 24. The screen 1000 includes the blank sub screen 1110A, the sub screen 1110B including the UI, the selected sub screen 1110C including a "heartbeat" program text, and the sub screen 1110D including a riding program text. The UI included in the sub screen 1110B includes a riding button 1601 for setting the display window 1310, and a heartbeat button 1602 for setting the display window 1320. The sub screen 1110B including the riding button 1601 and the heartbeat button 1602 may be switched over to a turned-off state and hidden after a predetermined period of time elapses.

Figure 26:
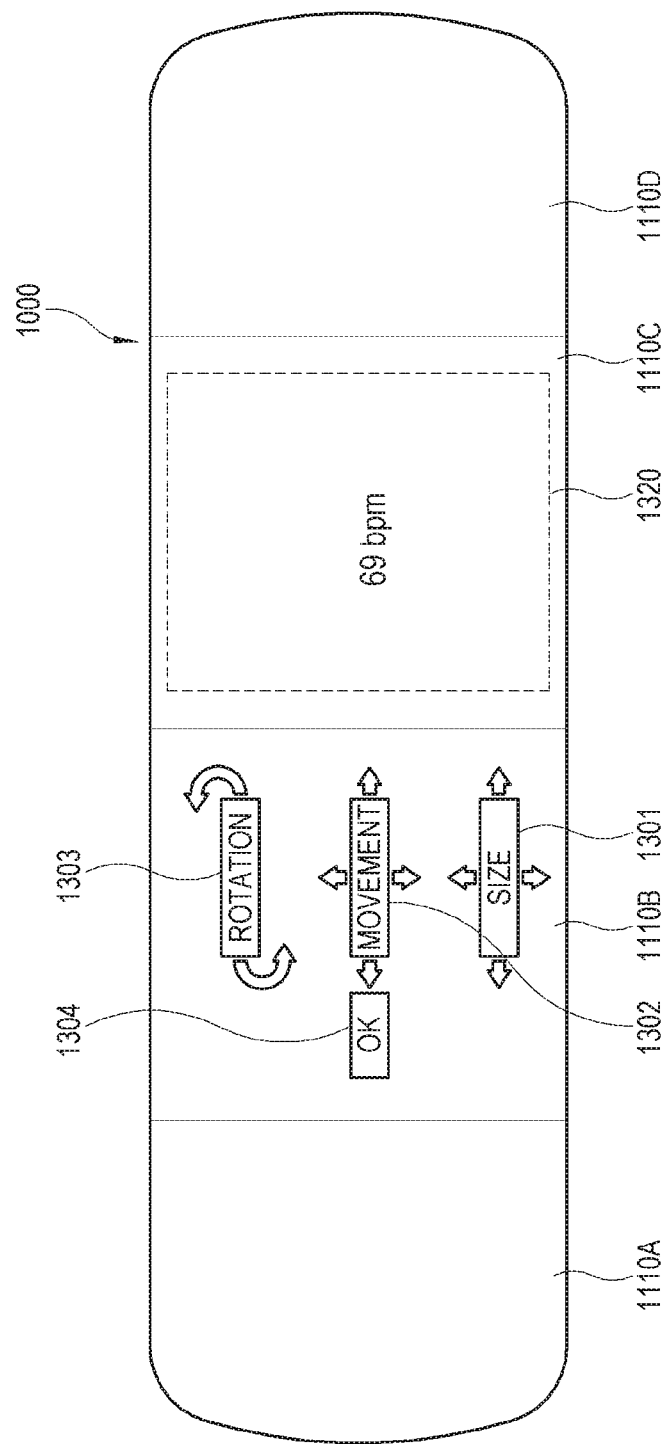
FIG. 26 illustrates a screen of a UI when "heartbeat" is selected in FIG. 25.

FIG. 26 illustrates a screen of a UI when the heartbeat button 1602 is selected on the screen in FIG. 25. As shown therein, the screen 1000 includes the blank sub screen 1110A, the sub screen 1110B including the second UI, the sub screen 1110C including a heartbeat text within a display window 1320, and the blank sub screen 1110D. The second UI included in the sub screen 1110B includes the size adjustment button 1301 for the display window 1320 displayed within the sub screen 1110C, the movement control button 1302, the rotation control button 1303, and the setting confirmation button 1304. The second UI is set to be displayed on the sub screen 1110B adjacent to the selected sub screen 1110C.

Figure 27:
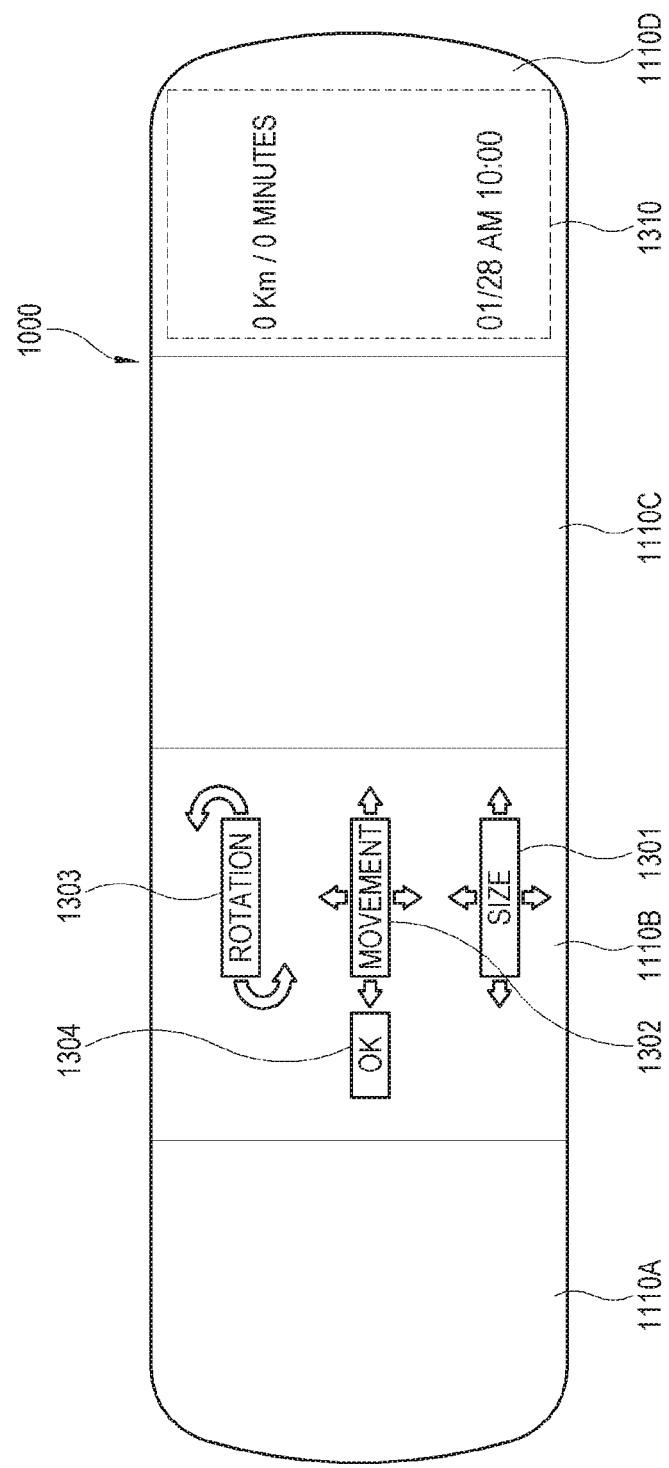
FIG. 27 illustrates a screen of a UI when "riding" is selected in FIG. 25.

FIG. 27 illustrates a screen of when the riding button 1601 is selected in the screen of FIG. 25. As shown therein, the screen 1000 includes the blank sub screen 1110A, the sub screen 1110B including the second UI, the blank sub screen 1110C, and the sub screen 1110D including the riding text within the display window 1310. The second UI included in the sub screen 1110B includes the size adjustment button 1301 for the display window 1320 displayed within the sub screen 1110C, the movement control button 1302, the rotation control button 1303, and the setting confirmation button 1304. The second UI is set to be displayed on the sub screen 1110B adjacent to the selected sub screen 1110C.

Figure 28:
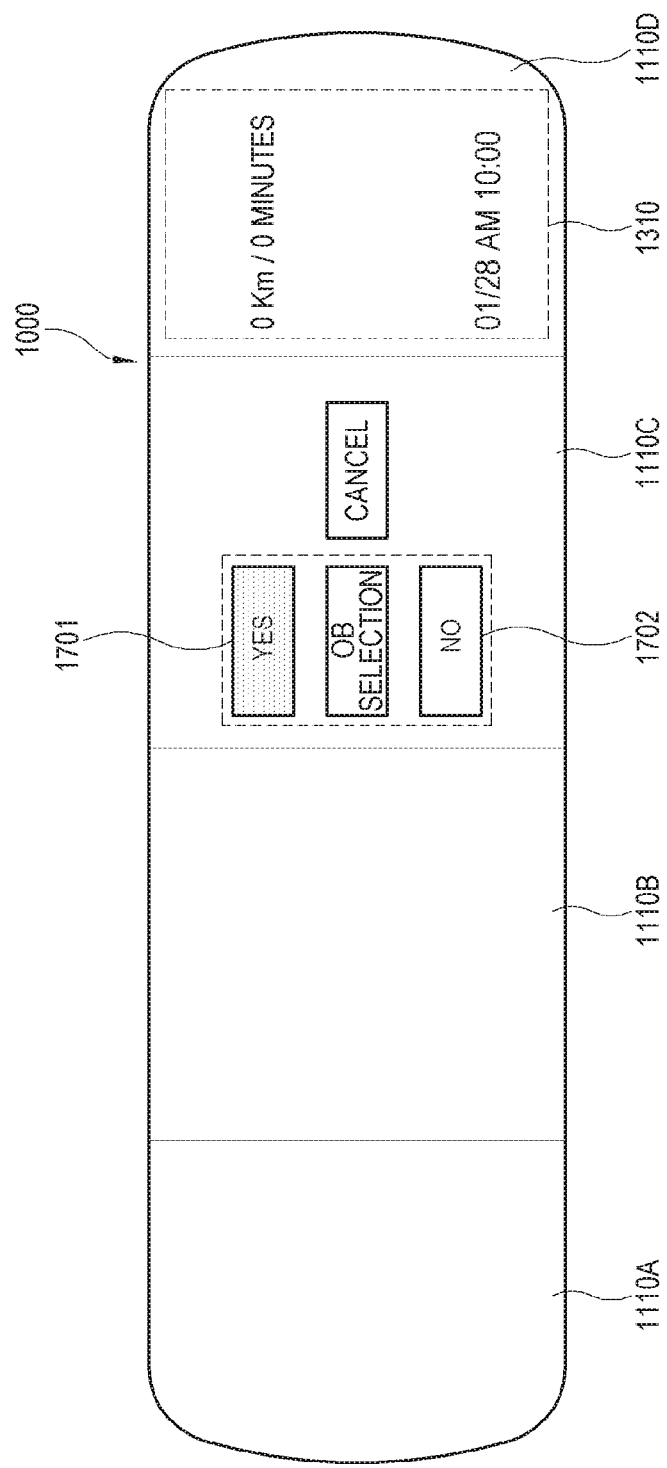
FIG. 28 illustrates a screen of a UI for adjusting an object of a program-related image

FIG. 28 illustrates a screen for adjusting the riding text displayed in the display window 1310 of the sub screen 1110D. When the sub screen 1110D is touched on the screen of FIG. 13 before or after the fine adjustment, the screen of FIG. 28 may be displayed. As shown therein, the screen 1000 includes the blank sub screens 1110A and 1110B, the sub screen 1110C including a third UI, and the sub screen 1110D including the riding text within the display window 1310. The third UI included in sub screen 1110C includes a YES button 1701 for selecting a text object within the sub screen 1110D, and a NO button 1702 for returning to the screen of FIG. 13.

Figure 29:
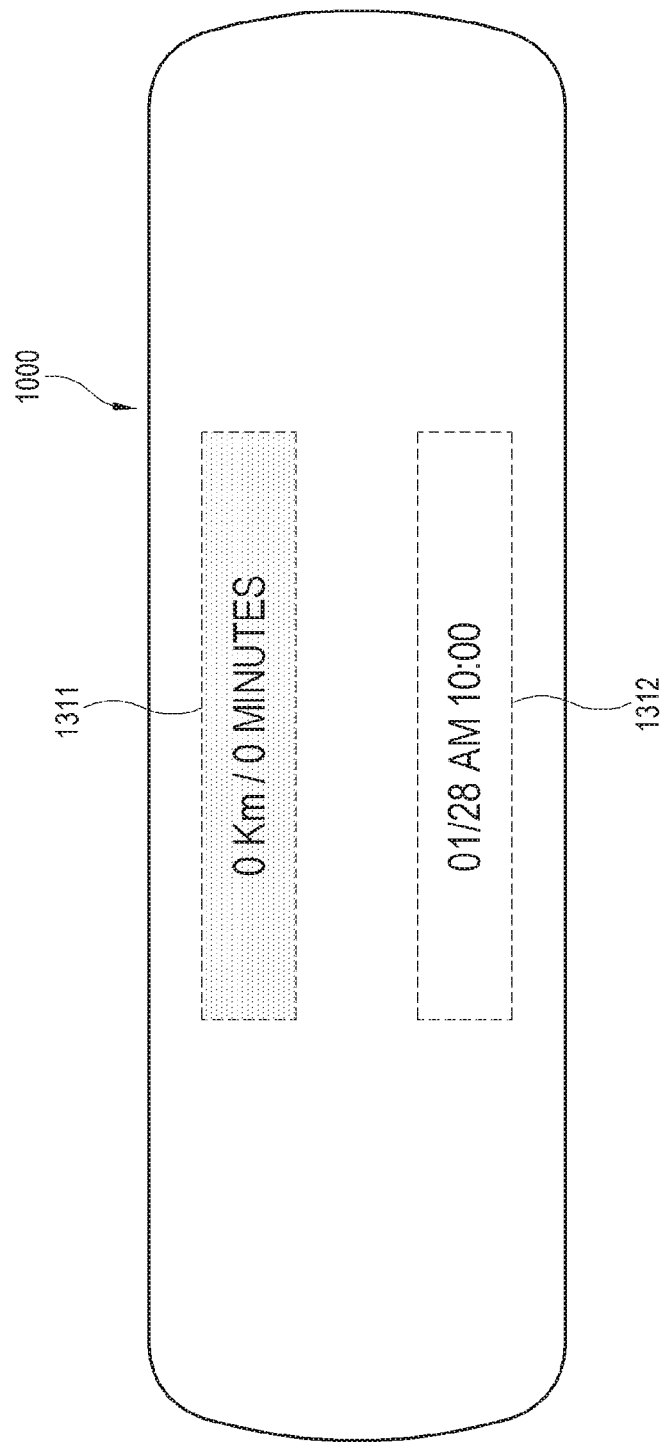
FIG. 29 illustrates a screen for selecting a riding record object in a UI displayed when "OB selection" is selected in FIG. 28.

FIG. 29 illustrates a screen of when the YES button 1701 is selected to select an object in FIG. 28. Referring to FIG. 29, the screen 1000 includes a riding record object 1311 and a time object 1312.

Figure 30:
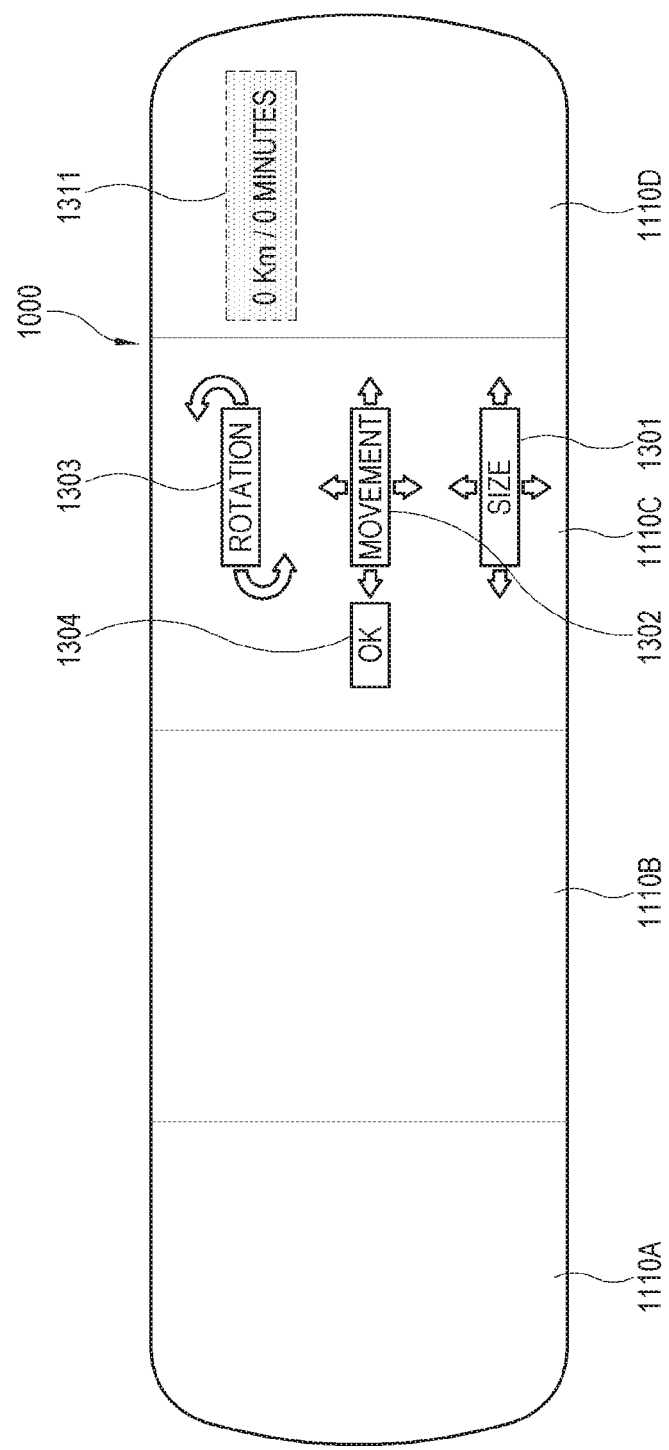
FIG. 30 illustrates a screen of a UI when the riding record object is selected.

FIG. 30 illustrates a screen of when the riding record object 1311 is selected in FIG. 29. As shown therein, the screen 1000 includes the blank sub screens 1110A and 1110B, the sub screen 1110C including the second UI, and the sub screen 1110D including the riding record object 1311. The second UI included in the sub screen 1110C includes the size adjustment button 1301 of the object 1311 displayed within the sub screen 1110D, the movement control button 1302, the rotation control button 1303, and the setting confirmation button 1304.

Figure 31:
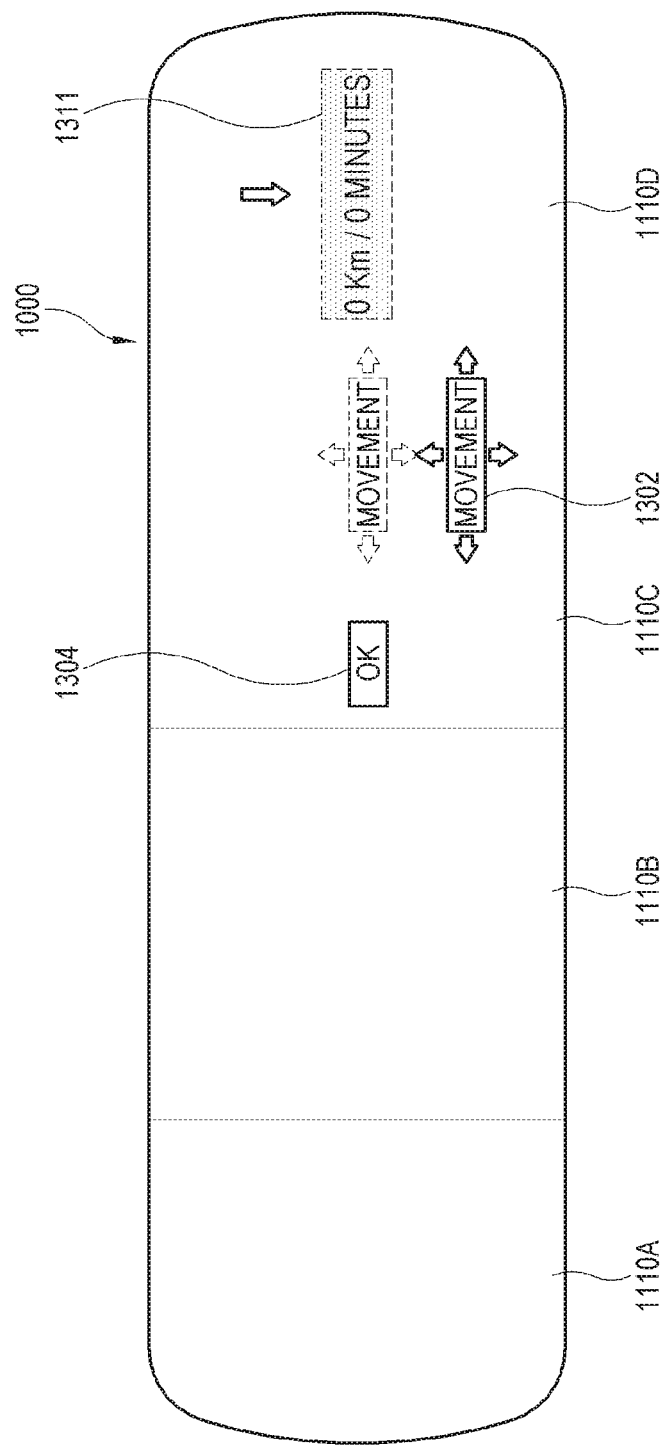
FIG. 31 illustrates a screen for moving a position of the riding record object in FIG. 30.

FIG. 31 illustrates a screen of selecting the movement button 1302 on the screen of FIG. 30 and moving down the object 1311 displayed on the selected sub screen 1110D. As shown therein, the movement button 1302 is moved down as touched and dragged in a direction desired for the movement, and the object 1311 displayed on the sub screen 1110D is also moved down. In this case, when the movement button 1302 is released from the touch, the movement button 1302 and the object 1311 are positioned as moved down. In this state, when the confirmation button 1304 is selected, the objet 1311 is set as moved, and the second UI for additional adjustment is displayed on the sub screen 1110C.

Figure 32:
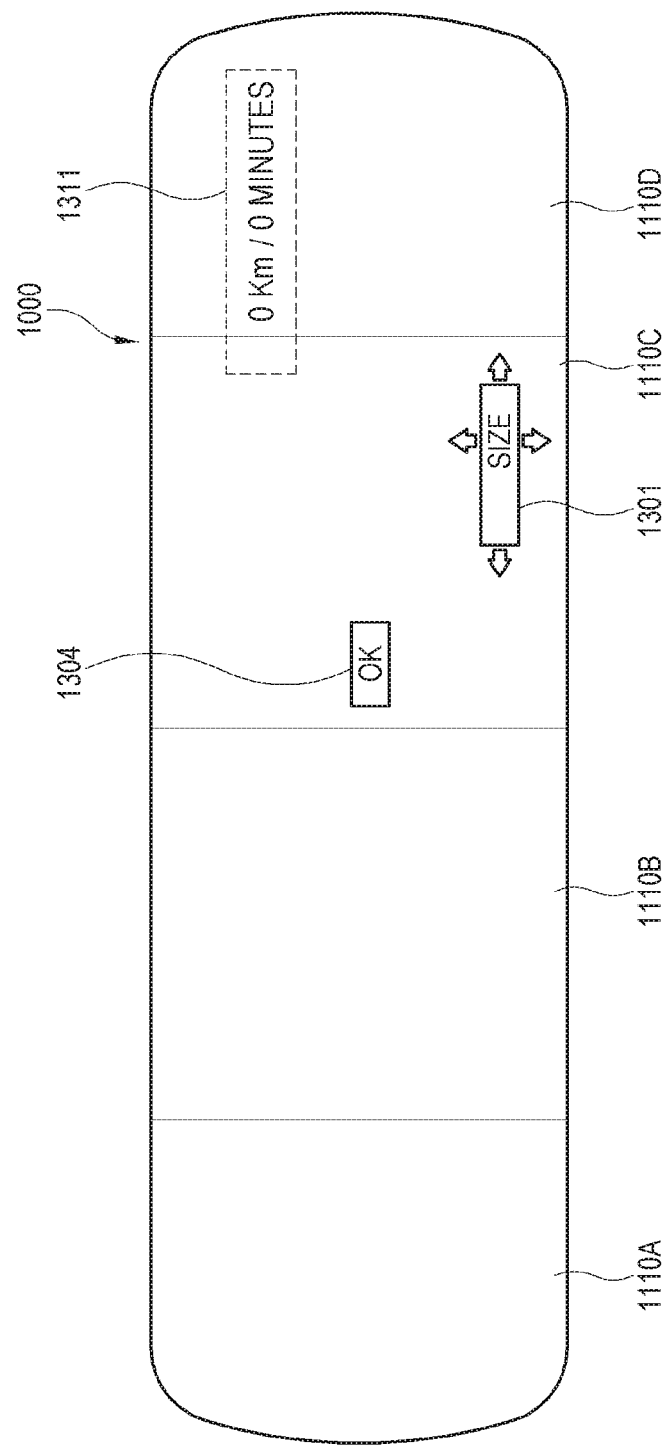
FIG. 32 illustrates a screen for enlarging the size of the riding record object in FIG. 30.

FIG. 32 illustrates a screen for enlarging the object 1311, displayed on the selected sub screen 1110D, leftward by selecting the size button 1301 on the screen of FIG. 30. As shown therein, the size button 1301 is enlarged leftward as touched and then dragged in a direction desired for the enlargement, and the object 1311 displayed on the sub screen 1110D is also enlarged leftward. In this case, when the size button 1301 is released from the touch, the size button 1301 and the object 1311 are positioned as enlarged. In this state, when the confirmation button 1304 is selected, the objet 1311 is set as enlarged, and the second UI for additional adjustment is displayed on the sub screen 1110C. In this case, when a touch is made at a top-left, top-right, bottom-left or bottom-right portion between the arrows of the size button 1301 and then dragged in a diagonal direction, the left side and right size of the object 1311 are equally enlarged or reduced.

Figure 33:
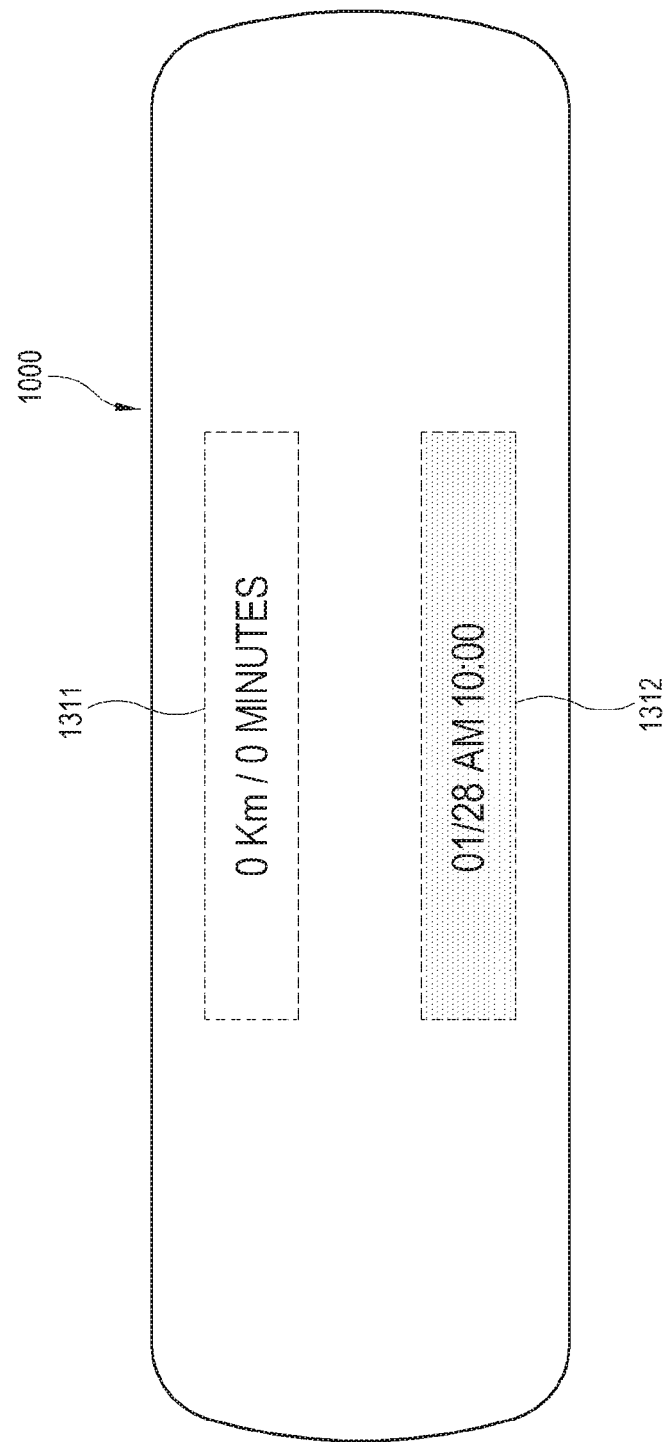
FIG. 33 illustrates a screen for selecting a time object on a UI displayed when "OB" is selected in FIG. 28.

FIG. 33 illustrates a screen for selecting a time object 1312 in FIG. 29 after the riding object is completely set.

Figure 34:
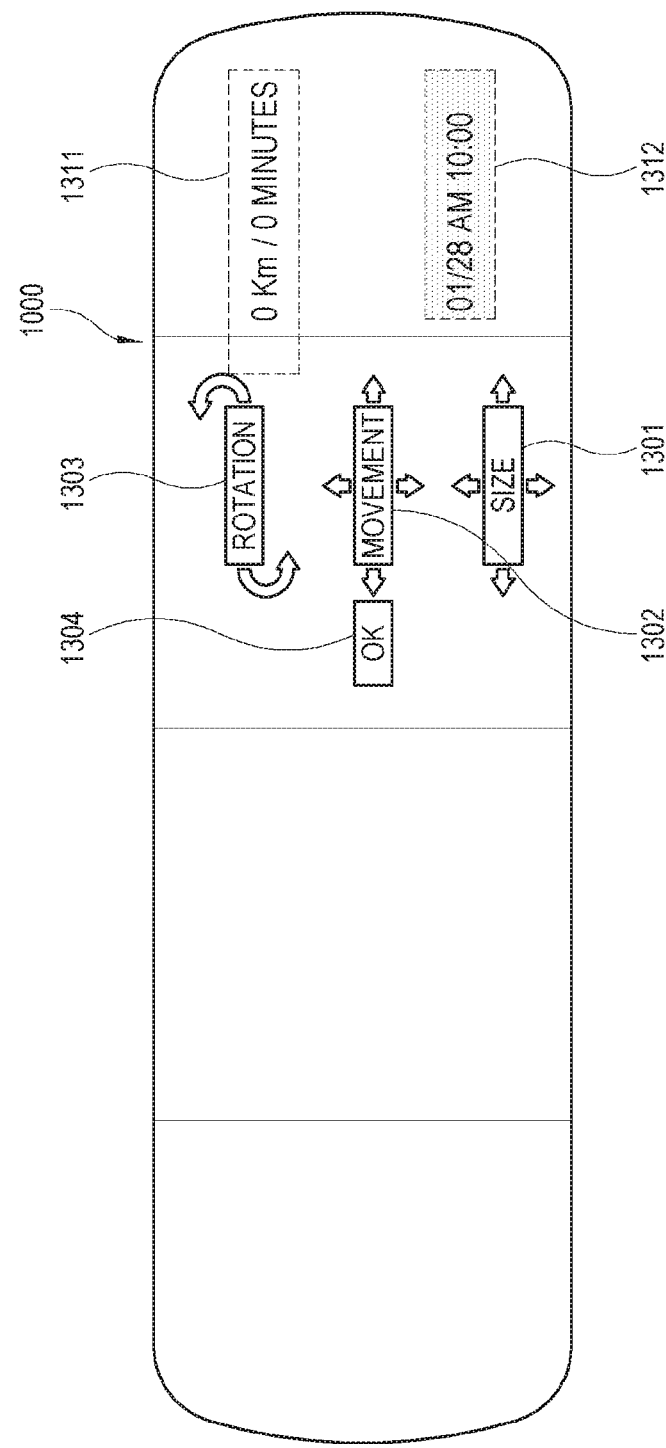
FIG. 34 illustrates a screen of a UI when a time displaying object is selected in FIG. 33.

FIG. 34 illustrates a screen of when the time object 1312 is selected in FIG. 29. As shown therein, the screen 1000 includes the blank sub screens 1110A and 1110B, the sub screen 1110C including the second UI, and the sub screen 1110D including the enlarged riding record object 1311 and the time object 1312. The second UI included in the sub screen 1110C includes the size adjustment button 1301 for the object 1312 displayed within the sub screen 1110D, the movement control button 1302, the rotation control button 1303, and the setting confirmation button 1304.

Figure 35:
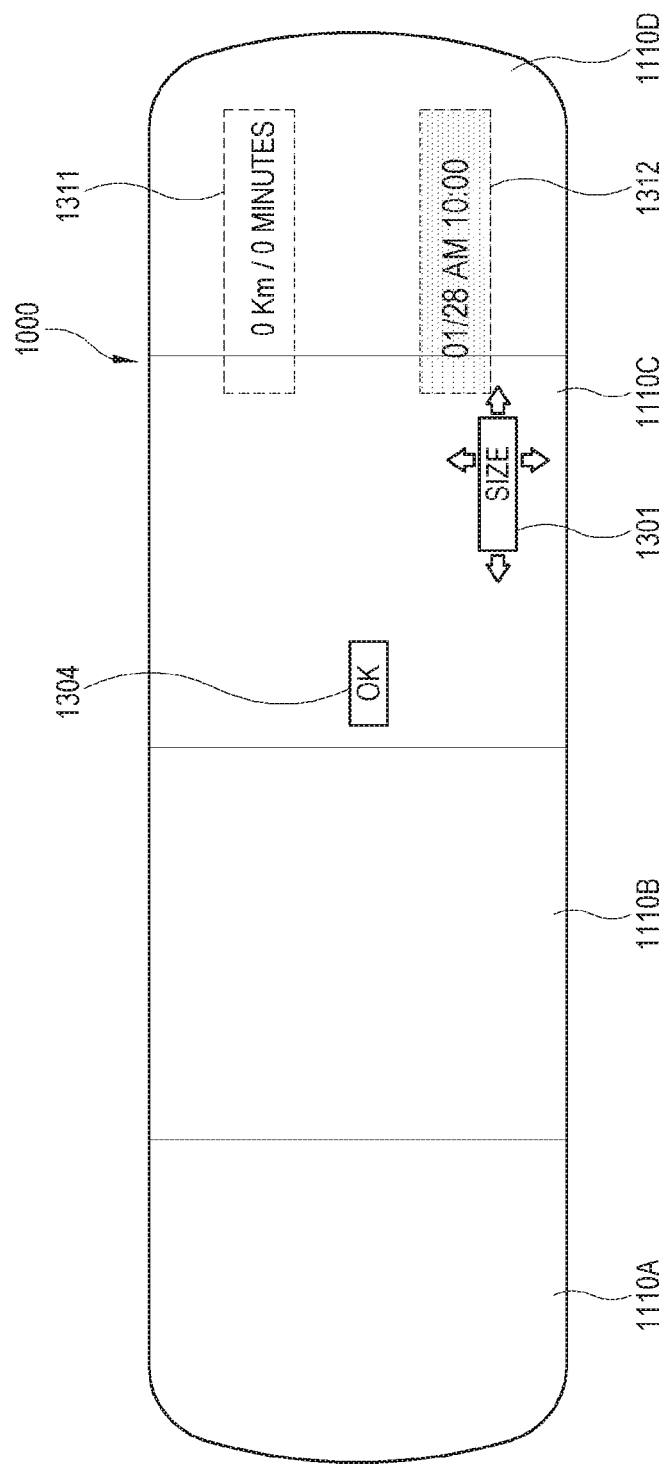
FIG. 35 illustrates a screen for enlarging the size of the time displaying object in FIG. 34.

FIG. 35 illustrates a screen for selecting the size button 1301 in the screen of FIG. 34 and leftward enlarging the object 1312 displayed on the selected sub screen 1110D. As shown therein, the size button 1301 is enlarged leftward as touched and dragged in a direction desired for the enlargement, and the object 1312 displayed on the sub screen 1110D is also enlarged leftward. In this case, when the size button 1301 is released from the touch, the size button 1301 and the object 1312 are positioned as enlarged. In this state, when the confirmation button 1304 is selected, the display window 1310 is set as enlarged and the second UI for additional adjustment is displayed on the sub screen 1110C.

Figure 36:
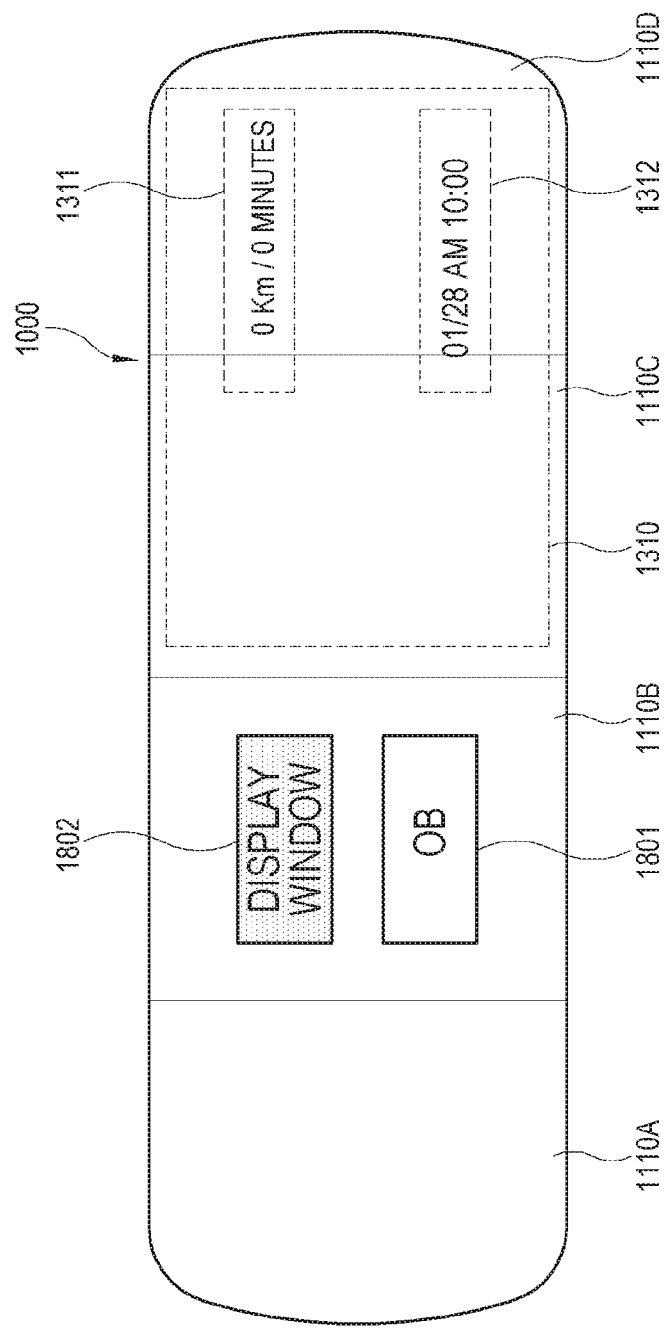
FIG. 36 illustrates a screen for displaying an object in a display window.

FIG. 36 illustrates a screen of when the objects 1311 and 1312 are completely adjusted on the screen of FIG. 35. As shown therein, the screen 1000 includes the blank sub screen 1110A, the sub screen 1110B including the second UI, and the sub screens 1110C and 1110D including the adjusted objects 1311 and 1312. The second UI included in the sub screen 1110B includes an OB button 1801 for adjusting the objects 1311 and 1312 displayed within the sub screen 1110C, and a display window button 1802 for adjusting the display window 1310. Here, the objects 1311 and 1312 are arranged at the right side throughout two sub screens 1110C and 1110D, and thus a considerable portion of the sub screen 1110C is wastefully remained as a display region.

Figure 37:
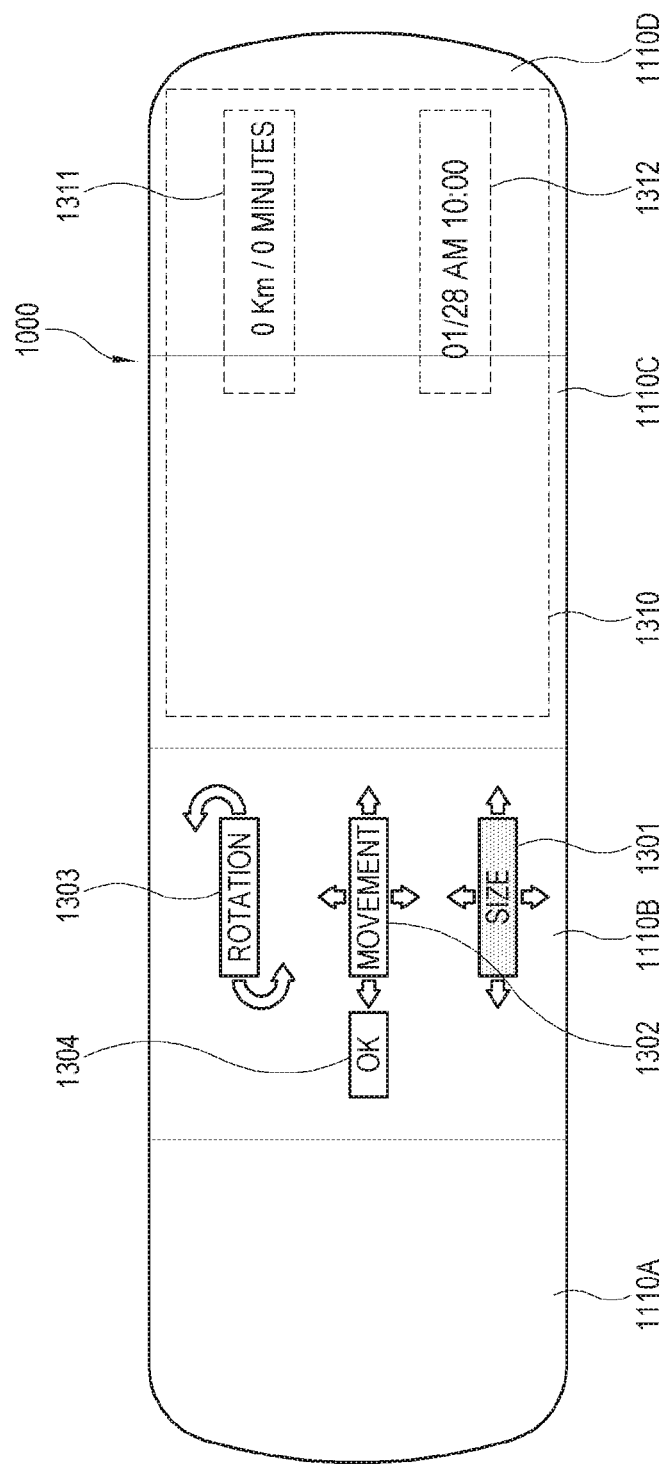
FIG. 37 illustrates a screen of a UI when display window adjustment is selected in FIG. 36.

FIG. 37 illustrates a screen of when the display window button 1802 is selected on the screen of FIG. 36. As shown therein, the screen 1000 includes the blank sub screen 1110A, the sub screen 1110B including the second UI, and the sub screens 1110C and 1110D including the adjusted objects 1311 and 1312. The second UI included in the sub screen 1110B includes the size adjustment button 1301 for the objects 1311 and 1312 displayed within the sub screen 1110C, the movement control button 1302, the rotation control button 1303, and the setting confirmation button 1304.

Figure 38:
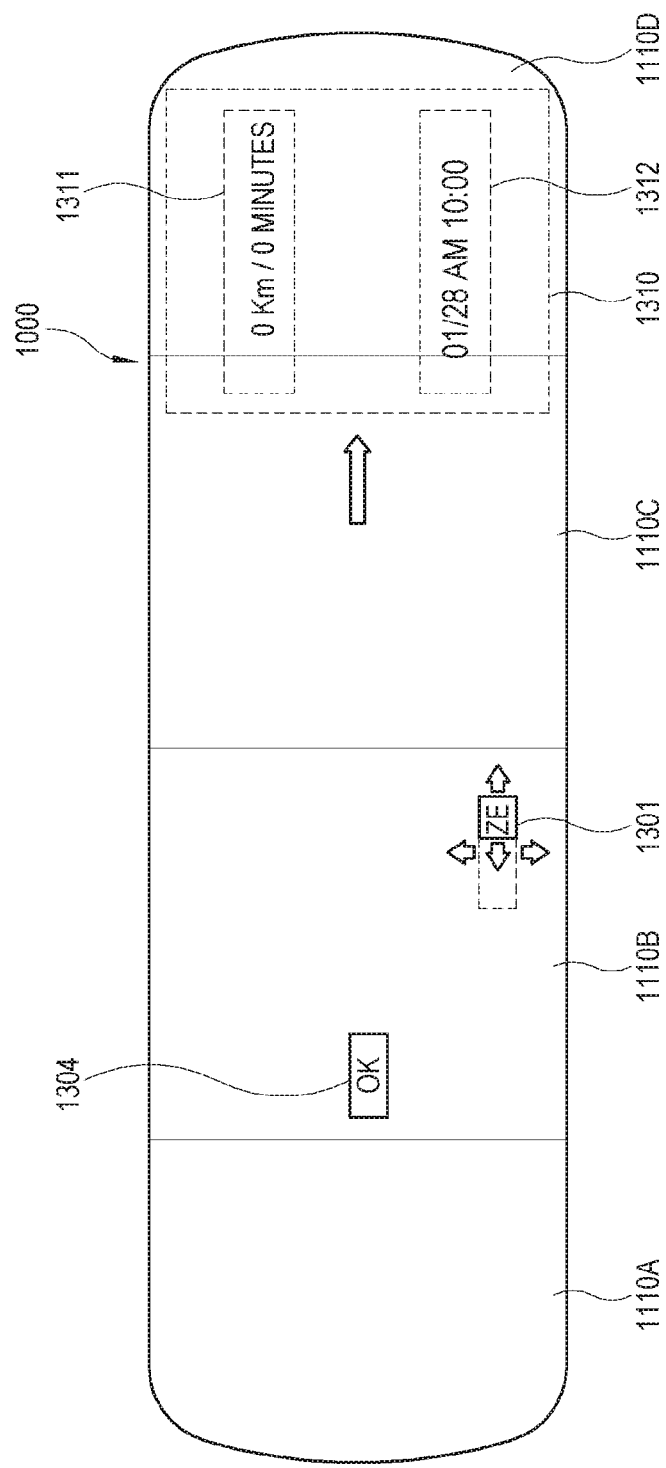
FIG. 38 illustrates a screen for reducing the size of the display window in FIG. 37.

FIG. 38 illustrates a screen for selecting the size button 1301 in FIG. 37 and reducing the size of the display window 1310 rightward. As shown therein, the size button 1301 is reduced rightward as touched and dragged in a direction desired for the reduction, and the left side of the display window 1310 is also reduced. In this case, when the size button 1301 is released from the touch, the size button 1301 and the display window 1310 are positioned as reduced. In this state, when the confirmation button 1304 is selected, the display window 1310 is set as enlarged, and the second UI for additional adjustment is displayed in the sub screen 1110B. Last, when a predetermined period of time elapses, the preset display window 1310 is stored as the power-saving display mode in the storage 130, and the other screen regions are turned off.

Although a few exemplary embodiments and drawings have been shown and described, it will be appreciated by those skilled in the art that various modifications and changes may be made in these exemplary embodiments without departing from the principles and spirit of the invention.

The operations according to the foregoing exemplary embodiments may be performed by a single controller or plural processors. In this case, a program command for performing the operations to be implemented by various computers may be recorded in a computer readable medium. The computer readable medium may contain a program command, a data file, a data structure, etc. or combination thereof. The program command may be specially designed and made for the foregoing embodiments, or publicly known and available to those skilled in the art. As an example of the computer readable medium, there are a magnetic medium such as a hard disk drive, a floppy disk, a magnetic tape, etc. an optical medium such as a compact disc read only memory (CD-ROM), a digital versatile disc (DVD), a magnetic-optical medium such as a floptical disk, and a hardware device such as a read only memory (ROM), a random access memory (RAM), a flash memory, etc. specially configured to store and execute a program command. As an example of the program command, there is not only a machine code made by a compiler but also a high-level language code to be executable by a computer through an interpreter or the like. If a base station or relay described in the present invention is fully or partially achieved by a computer program, the computer readable medium storing the computer program also belong to the present invention.

Therefore, the foregoing has to be considered as illustrative only. The scope of the invention is defined in the appended claims and their equivalents. Accordingly, all suitable modification and equivalents may fall within the scope of the invention.

INDUSTRIAL APPLICABILITY

The present invention is applicable to increase a battery usage time of a smart watch, a smart phone, and the like mobile apparatus.

The invention claimed is:

1. A display apparatus comprising:
a display comprising a screen;
a user input interface for receiving a user touch input; and
a processor configured to:
based on a user touch input for selecting a first region among a plurality of regions in the screen being received, control the display to display an image on the selected first region, and
make the other regions of the screen except the first region where the image is displayed be in a power-saving mode,
wherein the image is displayed in the selected first region after a release of the user touch input, and
wherein the processor is further configured to control the display to display a menu for receiving the user touch input, the menu comprising a menu item of at least one of movement, rotation or size adjustments of the first region.

2. The display apparatus according to claim 1, wherein the processor is further configured to control the display to display the image in the first region in response to a second user touch input for the power-saving display mode.

3. The display apparatus according to claim 1, wherein the processor is further configured to control the display to display the image in the first region in response to occurrence of an event.

4. The display apparatus according to claim 3, wherein the event occurs from an external apparatus.

5. The display apparatus according to claim 1, wherein the menu is displayed in response to selection of the first region.

6. The display apparatus according claim 1, wherein, based on the menu item of the at least one of the movement, the rotation or the size adjustments of the first region being selected the processor is further configured to hide menu items of the others of the movement, the rotation or the size adjustments of the first region.

7. The display apparatus according to claim 1, wherein the processor is further configured to control the display to display the menu in a second region adjacent to the selected first region.

8. The display apparatus according to claim 1, wherein the processor is further configured to control the display to display the menu throughout at least one region among the plurality of regions.

9. The display apparatus according to claim 1, further comprising a gyroscope configured to sense an orientation of the display,
wherein the processor is further configured to control the display to display the image in the first region which is activated corresponding to the sensed orientation of the display.

10. The display apparatus according to claim 1, further comprising a global positioning system (GPS) for sensing a location of the display apparatus,
wherein the processor configured to control the display to display the image in the power-saving mode according to the location sensed by the GPS.

11. The display apparatus according to claim 1, further comprising a GPS for sensing a location of the display apparatus,
wherein the processor is further configured to control the display to display the image in a normal display mode according to the location sensed by the GPS.

12. An image displaying method of a display apparatus, comprising:
based on a user touch input for selecting a region among a plurality of regions in a screen of the display apparatus being received, displaying an image on the selected region; and
making the other regions except the selected region where the image is displayed be in a power-saving mode,
wherein the image is displayed in the selected region after a release of the user touch input, and
further comprising:
displaying a menu for receiving the user touch input, the menu comprising a menu item of at least one of movement, rotation or size adjustments of the region.

13. A nonvolatile recording medium which stores a program for performing the image displaying method according to claim 12.

* * * * *